US009558176B2

United States Patent
Tur et al.

(10) Patent No.: US 9,558,176 B2
(45) Date of Patent: Jan. 31, 2017

(54) DISCRIMINATING BETWEEN NATURAL LANGUAGE AND KEYWORD LANGUAGE ITEMS

(71) Applicant: Microsoft Corporation, Redmond, WA (US)

(72) Inventors: Gokhan Tur, Los Altos, CA (US); Fethiye Asli Celikyilmaz, Mountain View, CA (US); Dilek Hakkani-Tür, Los Altos, CA (US); Larry P. Heck, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 14/155,097

(22) Filed: Jan. 14, 2014

(65) Prior Publication Data

US 2015/0161107 A1 Jun. 11, 2015

Related U.S. Application Data

(60) Provisional application No. 61/913,121, filed on Dec. 6, 2013.

(51) Int. Cl.
G06F 17/27 (2006.01)

(52) U.S. Cl.
CPC .................... G06F 17/27 (2013.01)

(58) Field of Classification Search
None
See application file for complete search history.

(56) References Cited

U.S. PATENT DOCUMENTS 5,671,333 A 9/1997 Catlett et al.
6,023,697 A 2/2000 Bates et al.
(Continued)

FOREIGN PATENT DOCUMENTS

| CN | 1313972 A | 9/2001 |
|---|---|---|
| CN | 1342290 A | 3/2002 |

(Continued)

OTHER PUBLICATIONS

Tur, et al., Spoken Language Understanding: Systems for Extracting Semantic Information from Speech, accessible at <<http://www.amazon.com/Spoken-Language-Understanding-Extracting-Information/dp/0470688246>>, Wiley, 1st edition, published on Apr. 25, 2011, Amazon.com product page only, retrieved on Jan. 9, 2014, 4 pages.

(Continued)

*Primary Examiner* — Benny Q Tieu
*Assistant Examiner* — Sunil Chacko
(74) *Attorney, Agent, or Firm* — Alin Corie; Sandy Swain; Micky Minhas

(57) ABSTRACT

This disclosure pertains to a classification model, and to functionality for producing and applying the classification model. The classification model is configured to discriminate whether an input linguistic item (such as a query) corresponding to either a natural language (NL) linguistic item or a keyword language (KL) linguistic item. An NL linguistic item expresses an intent using a natural language, while a KL linguistic item expresses the intent using one or more keywords. In a training phase, the functionality produces the classification model based on query click log data or the like. In an application phase, the functionality may, among other uses, use the classification model to filter a subset of NL linguistic items from a larger set of items, and then use the subset of NL linguistic items to train a natural (Continued)

language interpretation model, such as a spoken language understanding model.

20 Claims, 15 Drawing Sheets

(56) References Cited

U.S. PATENT DOCUMENTS

| | | | |
|---|---|---|---|
| 6,192,343 | B1 | 2/2001 | Morgan et al. |
| 6,314,398 | B1 | 11/2001 | Junqua |
| 6,502,081 | B1 | 12/2002 | Wiltshire et al. |
| 6,766,320 | B1 | 7/2004 | Wang et al. |
| 7,024,368 | B1 | 4/2006 | Matheson |
| 7,092,928 | B1 | 8/2006 | Elad et al. |
| 7,487,095 | B2 | 2/2009 | Hill |
| 7,606,714 | B2 | 10/2009 | Williams |
| 7,693,865 | B2 | 4/2010 | Lu et al. |
| 7,720,674 | B2 | 5/2010 | Kaiser et al. |
| 7,734,698 | B2 | 6/2010 | Mullis, II |
| 8,051,061 | B2 | 11/2011 | Niu et al. |
| 2002/0078044 | A1 | 6/2002 | Song et al. |
| 2002/0198714 | A1 | 12/2002 | Zhou |
| 2003/0236777 | A1 | 12/2003 | Conway |
| 2004/0158617 | A1 | 8/2004 | Shanny |
| 2004/0199375 | A1 | 10/2004 | Ehsani et al. |
| 2005/0105712 | A1 | 5/2005 | Williams |
| 2007/0156392 | A1 | 7/2007 | Balchandran |
| 2007/0203869 | A1 | 8/2007 | Ramsey et al. |
| 2008/0005793 | A1 | 1/2008 | Wenig et al. |
| 2008/0154877 | A1 | 6/2008 | Joshi |
| 2009/0006343 | A1 | 1/2009 | Platt et al. |
| 2009/0006344 | A1 | 1/2009 | Platt et al. |
| 2009/0006345 | A1 | 1/2009 | Platt et al. |
| 2009/0037175 | A1 | 2/2009 | Wang et al. |
| 2009/0204638 | A1 | 8/2009 | Hollier |
| 2009/0228264 | A1 | 9/2009 | Williams et al. |
| 2009/0254539 | A1 | 10/2009 | Wen |
| 2009/0265317 | A1 | 10/2009 | Buehrer et al. |
| 2009/0276419 | A1 | 11/2009 | Jones et al. |
| 2009/0299853 | A1 | 12/2009 | Jones et al. |
| 2010/0114944 | A1* | 5/2010 | Adler et al. .......... 707/770 |
| 2010/0158236 | A1 | 6/2010 | Chang et al. |
| 2011/0010367 | A1 | 1/2011 | Jockish et al. |
| 2011/0106617 | A1 | 5/2011 | Cooper |
| 2011/0208730 | A1 | 8/2011 | Jiang |
| 2012/0239653 | A1 | 9/2012 | Platt et al. |
| 2012/0290290 | A1 | 11/2012 | Tur et al. |
| 2012/0290293 | A1* | 11/2012 | Hakkani-Tur .... G06F 17/30864 704/9 |
| 2012/0290509 | A1 | 11/2012 | Heck et al. |
| 2013/0262361 | A1* | 10/2013 | Arroyo ............ G06N 5/02 706/46 |

FOREIGN PATENT DOCUMENTS

| | | |
|---|---|---|
| WO | 9944154 | 9/1999 |
| WO | 00/55843 | 9/2000 |

OTHER PUBLICATIONS

Celikyilmaz, et al., "ISNL? A Discriminative Approach to Detect Natural Language Like Queries for Conversational Understanding," accessible at <<http://research.microsoft.com/pubs/1929611/IS13-IsNL.pdf>>, Proceedings of the Interspeech, Aug. 25, 2013, pp. 2569-2573.

Pieraccin, et al., "A Speech Understanding System Based on Statistical Representation of Semantics," accessible at <<http://ieeexplore.ieee.org/xpls/abs_all.jsp?arnumber=225939>>, Proceedings of the IEEE International Conference on Acoustics, Speech, and Signal Processing, 1992, pp. 193-196.

Hakkani-Tur, Dilek, Microsoft Research employee information page, accessible at <<http://research.microsoft.com/en-us/people/dilekha/>>, retrieved on Jan. 9, 2014, 24 pages.

Kukn, et al., "Application of Semantic Classification Trees to Natural Language Understanding," IEEE Transactions on Pattern Analysis and Machine Intelligence, vol. 17, Issue 5, 1995, pp. 449-460.

Wang, et al., "Discriminative Models for Spoken Language Understanding," accessible at <<http://research.microsoft.com/pubs/75376/2006-wang-acero-icslp.pdf>>, Proceedings of the International Conference on Spoken Language Processing, 2006, 4 pages.

Raymond, et al., "Generative and Discriminative Algorithms for Spoken Language Understanding," accessible at <<http://lia.univ-avignon.fr/fileadmin/documents/Users/Intranet/fich_art/997-Interspeech2007.pdf>>, Proceedings of the Interspeech, 2007, 4 pages.

Seneff, Stephanie, "TINA: A Natural Language System for Spoken Language Applications," accessible at <<http://dl.acm.org/citation.cfm?id=1466888&CFID=376435216&CFTOKEN=74599430>>, Journal of Computational Linguistics, vol. 18, Issue 1, 1992, pp. 61-86.

Ward, et al., "Recent Improvements in the CMU Spoken Language Understanding System," accessible at <<http://acm.org>>, Proceedings of the Workshop on Human Language Technology, 1994, pp. 213-216.

Craswell, et al., "Random Walk on the Click Graph," accessible at <<http://dl.acm.org/citation.cfm?id=1277784 >>, Proceedings of the 30th Annual International ACM SIGIR Conference on Research and Development in Information Retrieval, 2007, pp. 239-246.

Hakkani-Tur, et al., "Employing Web Search Query Click Logs for Multi-Domain Spoken Language," accessible at <<http://research.microsoft.com/pubs/162419/ASRU11-1.pdf>>, Proceedings of the IEEE Automatic Speech Recognition and Understanding Workshop, 2011, pp. 419-424.

Hakkani-Tur, et al., "Exploiting Query Click Logs for Utterance Domain Detection in Spoken Language Understanding," accessible at <<http://ieeexplore.ieee.org/stamp/stamp.jsp?tp=&arnumber=5947638>>, Proceedings of the IEEE International Conference on Acoustics, Speech and Signal Processing, 2011, pp. 5636-5639.

Hakkani-Tur, et al., "Bootstrapping Domain Detection Using Query Click Logs for New Domains," Proceedings of the Interspeech, 2011, pp. 709-712.

Tur, et al., "Exploiting the Semantic Web for Unsupervised Natural Language Semantic Parsing," accessible at <<http://research.microsoft.com/pubs/172303/IS12-1.pdf>>, Proceedings of the Interspeech, Sep. 2012, 4 pages.

"Icsiboost, Open-source implementation of Boostexter (Adaboost based classifier)" accessible at <<https://code.google.com/p/icsiboost/>>, retrieved on Jan. 9, 2013, 2 pages.

Schapire, et al., "BoosTexter: A Boosting-based System for Text Categorization," accessible at <<http://citeseerx.ist.psu.edu/viewdoc/download?doi=10.1.1.145.7890&rep=rep1&type=pdf>>, Journal of Machine Learning, vol. 39, Issue 2-3, 2000, 34 pages.

Lafferty, et al., "Conditional Random Fields: Probabilistic Models for Segmenting and Labeling Sequence Data," accessible at <<http://citeseerx.ist.psu.edu/viewdoc/download;jsessionid=0C255AD66B8D1F098996CDA6361B79BD?doi=10.1.1.120.9821&rep=rep1&type=pdf>>, Proceedings of the Eighteenth International Conference on Machine Learning, 2001, 8 pages.

Gorin, et al., "How May I Help You?," accessible at <<http://www.researchgate.net/publication/222499956_How_may_I_help_you/file/d912f50c71801d6475.pdf>>, Journal of Speech Communication, vol. 23, Issue 1-2, 1997, pp. 113-127.

Hakkani-Tur, et al., "Translating Natural Language Utterances to Search Queries for SLU Domain Detection Using Query Click Logs," accessible at <<http://research.microsoft.com/pubs/172316/ICASSP12-2.pdf>>, Proceedings of the IEEE International Conference on Acoustics, Speech, and Signal Processing, Mar. 2012, pp. 4953-4956.

Cohn, et al., "Improving Generalization with Active Learning," accessible at <<http://citeseerx.ist.psu.edu/viewdoc/download?doi=10.1.1.119.2797&rep=rep1&type=pd>>, Journal of Machine Learning, vol. 15, Issue 2, 1994, pp. 201-221.

(56) References Cited

OTHER PUBLICATIONS

Hakkani-Tur, et al., "Mining Search Query Logs for Spoken Language Understanding," accessible at http://research.microsoft.com/pubs/172315/NAACL12.pdf>>, NAACL-HLT Workshop on Future Directions and Needs in the Spoken Dialog Community: Tools and Data, Jun. 2012, pp. 37-40.

Hillard, et al., "Learning Weighted Entity Lists from Web Click Logs for Spoken Language Understanding," accessible at <<http://research.microsoft.com/pubs/172331/Dustin-IS11.pdf>>, Proceedings of the Interspeech, Aug. 2011, pp. 705-708.

Li, et al., "Learning Query Intent from Regularized Click Graphs," accessible at <<http://dl.acm.org/citation.cfm?id=1390393>>, Proceedings of the 31st Annual ACM SIGIR Conference on Research and Development in Information Retrieval, 2008, 339-346.

Beitzel, et al., "Improving Automatic Query Classification via Semi-Supervised Learning," accessible at <<http://ieeexplore.ieee.org/stamp/stamp.jsp?tp=&arnumber=1565660>>, Proceedings of the Fifth IEEE International Conference on Data Mining, 2005, 8 pages.

Hosseini, et al., "Content Free Clustering for Search Engine Query Log," retrieved at <<http://www.wseas.us/e-library/conferences/2007beijing/papers/554-321.pdf?origin=publicationDetail>>, Proceedings of the 7th WSEAS International Conference on Simulation, Modelling and Optimization, 2007, pp. 201-206.

Agresti, Alan, "Categorical Data Analysis", Second Edition, Chapter 4, John Wiley and Sons,Copyright 2002, ISBN 0-471-36093-7, pp. 84-117, 721 pages.

Boldi et al., "The Query-flow Graph: Model and Applications", Proceedings of the ACM 17th Conference on Information and Knowledge Management (CIKM '08), NapaValley, California, Oct. 26-30, 2008, 9 pages.

Downey et al., "Heads and Tails: Studies of Web Search With Common and Rare Queries", Proceedings of the SIGIR'07, Amsterdam, Netherlands, Jul. 23-27, 2007, 2 pages.

Downey et al., "Understanding the Relationship Between Searchers' Queries and Information Goals," CIKM '08, Oct. 26-30, 2008, Napa Valley, California, USA; 10 pages.

Feng et al., "Webtalk: Towards Automatically Building Spoken Dialog Systems Through Mining Websites", IEEE ICASSP 2006, pp. I-573 through I-576, 4 pages.

Frampto et al., "Recent research advances in Reinforcement Learning in Spoken Dialogue Systems," The Knowledge Engineering Review, vol. 24:4, pp. 375-408 and Cambridge University Press, 2009, 30 pages.

Griol et al., "A statistical approach to spoken dialog systems design and evaluation", Elsevier's Speech communication 50 (2008), Apr. 5, 2008, pp. 666-682, 17 pages.

Griol et al., "A Statistical Dialog Manager for the LUNA Project", published in Interspeech,Brighton, UK, 2009, 4 pages.

Hassan et al., "Beyond DCG: User Behavior as a Predictor of a Successful Search", Proceedings of the ACM conference on Web Search and Data Mining (WSDM 2010), New York City, New York, Feb. 2010, 10 pages.

Jabaian et al., "Investigating multiple approaches for SLU portability to a new language", Proceedings of the 11th Annual Conference of the International Speech Communication Association, Interspeech 2010, Makuhari, Chiba, Japan, Sep. 26-30, 2010, 4 pages.

Jarvelin, Kalervo and Jaana Kekalainen, "Cumulated Gain-Based Evaluation of IR Techniques", ACM Transactions on Information Systems, vol. 20, No. 4, Oct. 2002, pp. 422-446, 30 pages.

Jarvelin et al., "Discounted Cumulated Gain based Evaluation of Multiple-Query IR Sessions", ECIR, vol. 4956 of Lecture Notes in Computer Science, 2008, 12 pages.

Jones et al., "Beyond the Session Timeout: Automatic Hierarchical Segmentation of SearchTopics in Query Logs", Proceedings of the ACM 17th Conference on Information and Knowledge Management (CIKM '08), Napa Valley, California, Oct. 26-30, 2008, 10 pages.

Lee et al., "Recent Approaches to Dialog Management for Spoken Dialog Systems", Journal of Computing Science and Engineering, vol. 4, No. 1, Mar. 2010, 22 pages.

Lemon, Oliver and Olivier Pietquin, "Machine Learning for Spoken Dialogue Systems", Interspeech 2007, Antwerp, Belgium, Aug. 27-31, 2007, pp. 2685-2688, 4 pages.

Lin et al., "Using Hidden Markov Model to Predict the Surfing User's Intention of Cyber Purchase on the Web", Journal of Global Business Management, vol. 5, No. 5, 2009, 6 pages.

Miller et al., "Statistical Language Processing Using Hidden Understanding Models", retrieved on Jun. 1, 2011, pp. 278-282, 5 pages.

Scheffler, Konrad and Steve Young, "Automatic learning of dialogue strategy using dialogue simulation and reinforcement learning", Proceedings of the Human Language Technologies (HLT), San Diego, California, 2002, 7 pages.

Singhal et al., "Learning Routing Queries in a Query Zone." Proceedings of the 20th ACM SIGIR, Jul. 31, 1997, vol. 31, pp. 25-32, 8 pages.

Singla, Adish and Ryen W. White, "Sampling High-Quality Clicks from Noisy Click Data," WWW 2010, ACM, Apr. 26-30, 2010, 2 pages.

Solsona et al., "Adaptive Language Models for Spoken Dialogue Systems", 2002 IEEE, pp. I-37 through I-40, 4 pages.

Tur et al., "Combining active and semi-supervised learning for spoken language understanding", Speech communication 45, 2005, pp. 171-186, 16 pages.

Walker et al., "PARADISE: A Framework for Evaluating Spoken Dialogue Agents", Proceedings of the ACL-EACL, Madrid, Spain, Jul. 1997, pp. 271-280, 10 pages.

Wang et al., "Leveraging Semantic Web Search and Browse Sessions for Multi-Turn Spoken Dialog Systems", 2014 IEEE International Conference on Acoustic, Speech and Signal Processing (ICAASP), pp. 4882-4886, 2014, 5 pages.

Williams et al., "Scaling Up POMDPs for Dialog Management: The "Summary POMDP" Method", Proceedings of the IEEE Workshop on Automatic Speech Recognition and Understanding(ASRAU), San Juan, Puerto Rico, 2005, 6 pages.

Williams, Jason D. PhD., "Partially Observable Markov Decision Processes for Spoken Dialogue Management," Thesis from the Department of Engineering, University of Cambridge, Apr. 2006, 138 pages.

U.S. Appl. No. 61/913,121 titled "Discriminating Between Natural Language and Keyword Language Items" filed Dec. 6, 2013 by Inventor Gokhan Tur, 53 pages.

U.S. Appl. No. 61/485,664 titled "Exploiting Query Click Logs for Domain Detection in Spoken Language Understanding" filed May 13, 2011 by Inventor Hakkani-Tur et al., 14 pages.

Non-Final Office Action mailed Feb. 4, 2013 from U.S. Appl. No. 13/234,202, 27 pages.

Amendment filed Jul. 2, 2013 to the Non-Final Office Action mailed Feb. 4, 2013 from U.S. Appl. No. 13/234,202, 10 pages.

Final Office Action mailed Jul. 12, 2013 from U.S. Appl. No. 13/234,202, 27 pages.

Amendment filed Oct. 14, 2013 to the Final Office Action mailed Jul. 12, 2013 from U.S. Appl. No. 13/234,202, 11 pages.

Non-Final Office Action mailed Feb. 25, 2014 from U.S. Appl. No. 13/234,202, 26 pages.

Amendment and Response filed May 27, 2014 to the Non-Final Office Action mailed Feb. 25, 2014 from U.S. Appl. No. 13/234,202, 12 pages.

Final Office Action mailed Jun. 12, 2014 from U.S. Appl. No. 13/234,202, 29 pages.

Amendment and Response filed Sep. 12, 2014 to the Final Office Action mailed Jun. 12, 2014 from U.S. Appl. No. 13/234,202, 12 pages.

Non-Final Office Action mailed Nov. 17, 2014 from U.S. Appl. No. 13/234,202, 22 pages.

Amendment and Response filed Feb. 25, 2015 to the Non-Final Office Action mailed Nov. 17, 2014 from U.S. Appl. No. 13/234,202, 12 pages.

Final Office Action mailed Mar. 13, 2015 from U.S. Appl. No. 13/234,202, 28 pages.

(56) References Cited

OTHER PUBLICATIONS

Amendment and Response filed Aug. 13, 2015 to the Final Office Action mailed Mar. 13, 2015 from U.S. Appl. No. 13/234,202, 14 pages.
Non-Final Office Action mailed Oct. 5, 2015 from U.S Appl. No. 13/234,202, 28 pages.
Applicant-Initiated Interview Summary mailed Jan. 29, 2016 from U.S. Appl. No. 13/234,202, 3 pages.
Amendment and Response filed Mar. 7, 2016 to the Non-Final Office Action mailed Oct. 5, 2015 to U.S. Appl. No. 13/234,202, 11 pages.
International Search Report and Written Opinion mailed Nov. 23, 2012 from PCT Patent Application No. PCT/US2012/037668, 10 pages.
International Preliminary Report on Patentability mailed Nov. 28, 2013 from PCT Patent Application No. PCT/US2012/037668, 7 pages.
First Office Action and Search Report mailed Jun. 1, 2015 from China Patent Application No. 201280023613.6, 13 pages.
Second Office Action and Search Report mailed Jan. 26, 2016 from China Patent Application No. 201280023613.6, 20 pages.
U.S. Appl. No. 61/485,778 titled "Training Statistical Dialog Managers in Spoken Dialog Systems with Web Data" filed May 13, 2011 by Inventor Heck et al., 13 pages.
International Search Report and Written Opinion in Application PCT/US2012/037667 dated Nov. 28, 2012, 9 pages.
International Preliminary Report on Patentability mailed Nov. 28, 2013 from PCT Patent Application No. PCT/US2012/037667, 6 pages.
First Office Action and Search Report mailed Jun. 2, 2015 from China Patent Application No. 201280023617.4, 15 pages.
Response filed Aug. 11, 2015 to the First Office Action and Search Report mailed Jun. 2, 2015 from China Patent Application No. 201280023617.4, 11 pages.
Second Office Action and Search Report mailed Dec. 25, 2015 from China Patent Application No. 201280023617.4, 16 pages.
Response filed Mar. 9, 2016 to the Second Office Action and Search Report mailed Dec. 25, 2015 from China Patent Appl. No. 201280023617.4, 13 pages.
European Search Report mailed Sep. 21, 2015 from European Patent Applicaton No. 12786374.4, 6 pages.
Non-Final Office Action mailed Jun. 19, 2013 from U.S. Appl. No. 13/234,186, 22 pages.
Amendment filed Sep. 19, 2013 to the Non-Final Office Action mailed Jun. 19, 2013 from U.S. Appl. No. 13/234,186, 12 pages.
Final Office Action mailed Jan. 29, 2014 to U.S Appl. No. 13/234,186, 18 pages.
Amendment filed Apr. 28, 2014 to the Final Office Action mailed Jan. 29, 2014 to U.S. Appl. No. 13/234,186, 10 pages.
Non-Final Office Action mailed Jul. 31, 2014 from U.S. Appl. No. 13/234,186, 20 pages.
Amendment and Response filed Oct. 31, 2014 to the Non-Final Office Action mailed Jul. 31, 2014 from U.S. Appl. No. 13/234,186, 11 pages.
Final Office Action mailed Mar. 11, 2015 from U.S. Appl. No. 13/234,186, 18 pages.
Amendment and Response filed Aug. 11, 2015 to the Final Office Action mailed Mar. 11, 2015 from U.S. Appl. No. 13/234,186, 14 pages.
Non-Final Office Action mailed Sep. 3, 2015 from U.S Appl. No. 13/234,186, 17 pages.
Applicant-Initiated Interview Summary mailed Dec. 23, 2015 from U.S. Appl. No. 13/234,186, 19 pages.
Amendment and Response filed Feb. 3, 2016 to the Non-Final Office Action mailed Sep. 3, 2015 from U.S. Appl. No. 13/234,186, 13 pages.
Final Office Action mailed Mar. 14, 2016 from U.S. Appl. No. 13/234,186, 14 pages.
Final Office Action mailed Mar. 29, 2016 to U.S. Appl. No. 13/234,202, 32 pages.
Response filed Apr. 11, 2016 to the Second Office Action and Search Report mailed Jan. 26, 2016 from China Patent Application No. 201280023613.6, 15 pages.
Rule 70 Communication mailed Oct. 8, 2015 to European Patent Application No. 12786677.0 , 1 page.
Response filed Apr. 15, 2016 to the Rule 70 Communication mailed Oct. 8, 2015 to European Patent Application No. 12786677.0 , 19 pages.
Rule 70 communication mailed Oct. 8, 2015 to European Patent Application No. 12786374.4, 1 page.
Response filed Apr. 18, 2016 to the Rule 70 Communication mailed Oct. 8, 2015 to European Patent Application No. 12786374.4, 9 pages.

* cited by examiner

DISCRIMINATING BETWEEN NATURAL LANGUAGE AND KEYWORD LANGUAGE ITEMS

This application claims the benefit of U.S. Provisional Application No. 61/913,121 (the '121 application), filed Dec. 6, 2013. The '121 application is incorporated by reference herein in its entirety.

BACKGROUND

Traditional machine learning techniques use human annotators to manually apply labels to training data. However, manual techniques for annotating training data can be labor-intensive and inefficient. To address this difficulty, some recent techniques have attempted to leverage query click log data to automatically generate the training data. Query click log data identifies queries submitted by users of a search system, together with the sites that the users clicked on or otherwise selected in response to those queries. There is nevertheless room for improvement with respect to the quality of the training data produced by these automated techniques.

SUMMARY

This disclosure pertains to a classification model, as well as to functionality for producing and applying the classification model. The classification model is configured to discriminate whether an input linguistic item (such as a query) corresponds to either a natural language (NL) linguistic item or a keyword language (KL) linguistic item. An NL linguistic item expresses an intent using a natural language, while a KL linguistic item expresses the intent using one or more keywords. In view of the above behavior, the classification model is referred to herein as an NL-KL classification model.

One application environment can use the NL-KL classification model to filter a set of input linguistic items, to produce a subset of NL linguistic items and a subset of KL linguistic items. A machine leaning technique can then produce a natural language interpretation model (such as a spoken language understanding model) based on the subset of NL linguistic items (that is, by discarding the KL linguistic items). The filtering operation performed by the NL-KL classification model improves the quality of the training data fed to the machine learning technique, which may, in turn, improve the accuracy of any model produced using the training data.

Other application environments described herein can use the NL-KL classification model in other respective ways.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for generating and applying a model which discriminates between natural language (NL) linguistic items and keyword language (KL) linguistic items. Section B sets forth illustrative methods which explain the operation of the functionality of Section A. Section C describes illustrative computing functionality that can be used to implement any aspect of the features described in Sections A and B.

Figure 16:
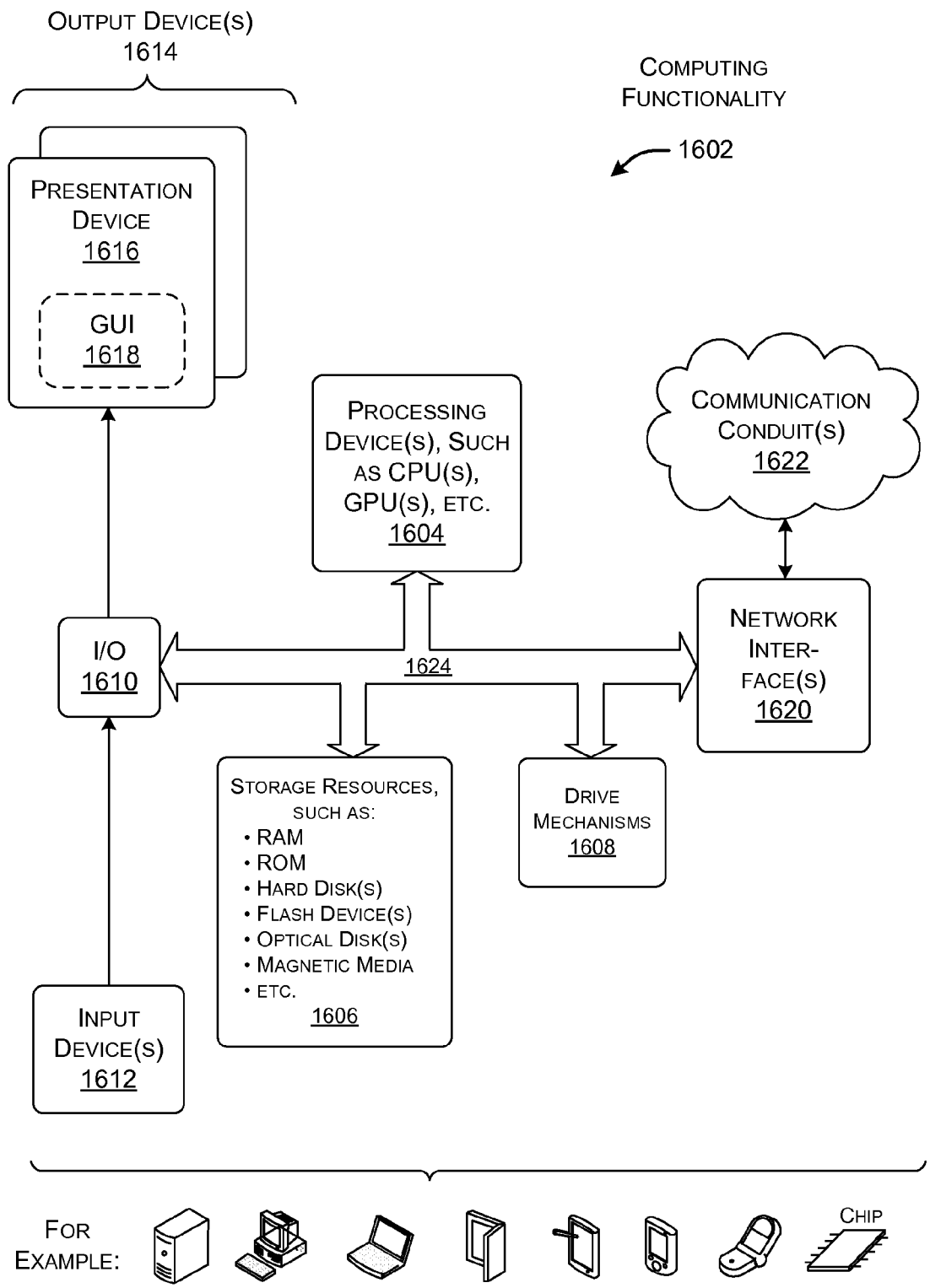
FIG. 16 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 16, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Computer System

A.1. Overview

Figure 1:
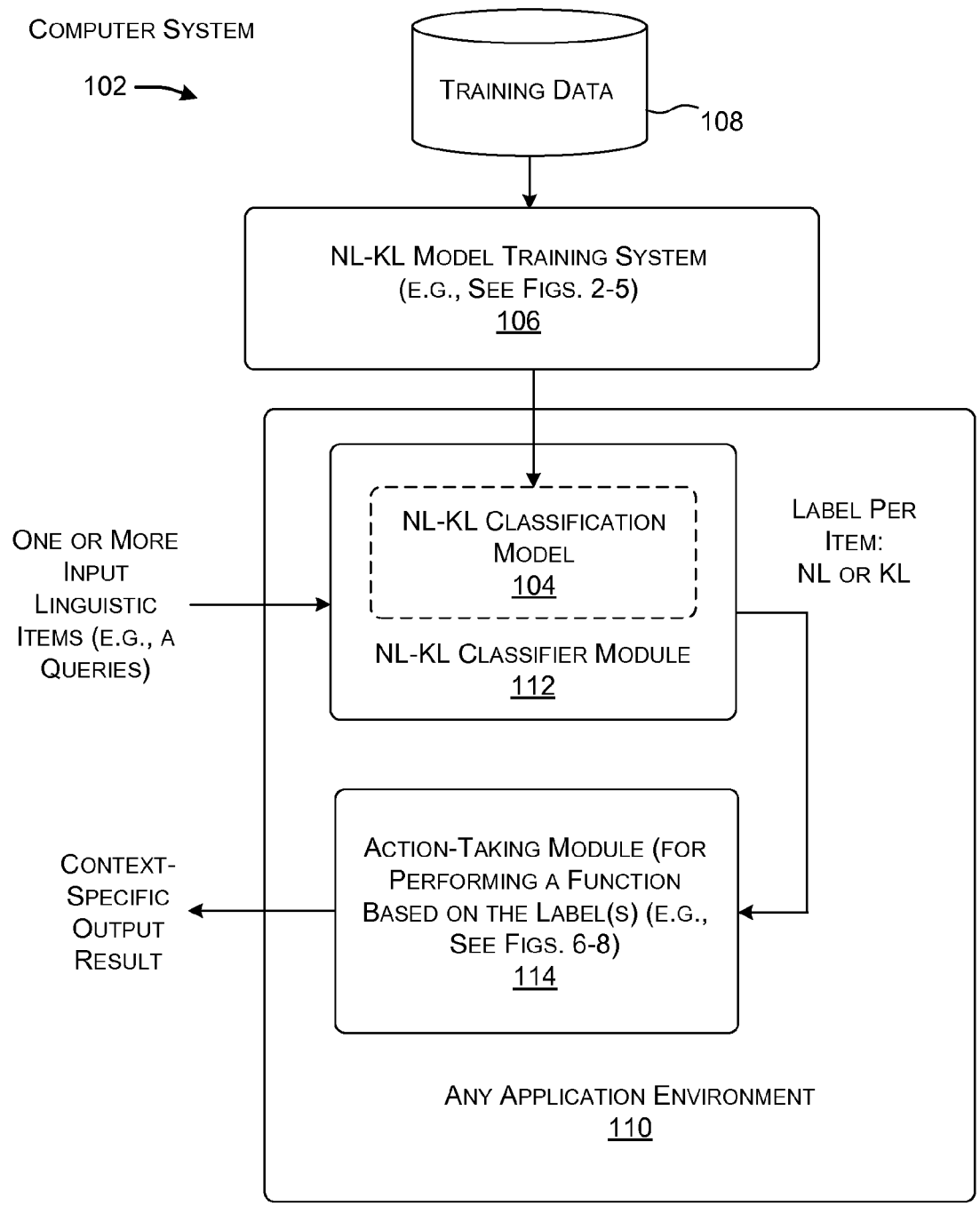
FIG. 1 shows an overview of a computer system for generating and applying a classification model (henceforth referred to as an NL-KL classification model).

FIG. 1 shows an overview of a computer system 102 for generating and then applying a classification model 104. The classification model 104 determines whether an input linguistic item is expressed in a natural language (NL) or a keyword language (KL). A natural language corresponds to any symbolic system that humans typically use to express intent in ordinary conversation. In some natural languages, a valid statement includes words having different respective parts of speech, assembled together in a manner that conforms to accepted rules associated with that natural language. By contrast, a keyword language corresponds to any manner of expressing intent using one or more keywords. The keywords express the essence of a user's intent in a skeletonized or abbreviated form (compared to an NL linguistic item that expresses the same intent). In one context, a user may use a keyword language to retrieve information from an automated search system or a retrieval system. In another context, a user may use a keyword language to summarize a document to allow an archival system to properly categorize the document, and to allow others to later find and retrieve the document.

For example, assume that a user wishes to determine the number of Super Bowl losses suffered by the Minnesota Vikings, an American football team. The user may express this question in a natural language by asking, "I want to know how many times the Vikings have lost at the Super Bowl." The user may alternatively express this query in keyword language using the keywords, "Vikings, Super Bowl losses."

By virtue of the fact that the classification model 104 distinguishes between NL and KL linguistic items, it is henceforth referred to as an NL-KL classification model 104. This term also serves to distinguish the NL-KL classification model 104 from other types of models discussed later, such as a spoken language understanding (SLU) model.

More generally, the term linguistic item corresponds to any manner of expressing the user's intent using one or more words or other units of expression associated with a language. In many examples, the linguistic items will correspond to queries that users formulate to ask questions. But a linguistic item can also express a command, comment, exclamation, etc. A linguistic item that is expressed in a natural language is referred to as an NL linguistic item. A linguistic item that is expressed in a keyword language is referred to as a KL linguistic item.

In FIG. 1, a training system 106 uses a machine learning technique to generate the NL-KL classification model 104, based on training data provided in one or more data stores 108. Subsection A.2 (below) provides further details regarding one illustrative technique that the training system 106 can use to perform this task.

Any application environment 110 can apply the NL-KL classification model 104. Broadly stated, the application environment 110 may include an NL-KL classifier module 112 and an action-taking module 114. The NL-KL classifier module 112 uses the NL-KL classification model 104 to apply a label to an input linguistic item (e.g., a query), which identifies whether the input linguistic item is an NL linguistic item (expressed in a natural language) or a KL linguistic item (expressed in a keyword language). The action-taking module 114 performs any environment-specific action based on the label associated with the linguistic item. Subsection A.3 (below) provides further details regarding different kinds of application environments. In some environments, the application environment 110 operates on a plurality of input linguistic items to generate a subset of NL linguistic items and a subset of KL linguistic items. The application environment 110 can then take further action on the subset of NL linguistic items, such as using this data to train another model.

Figure 9:
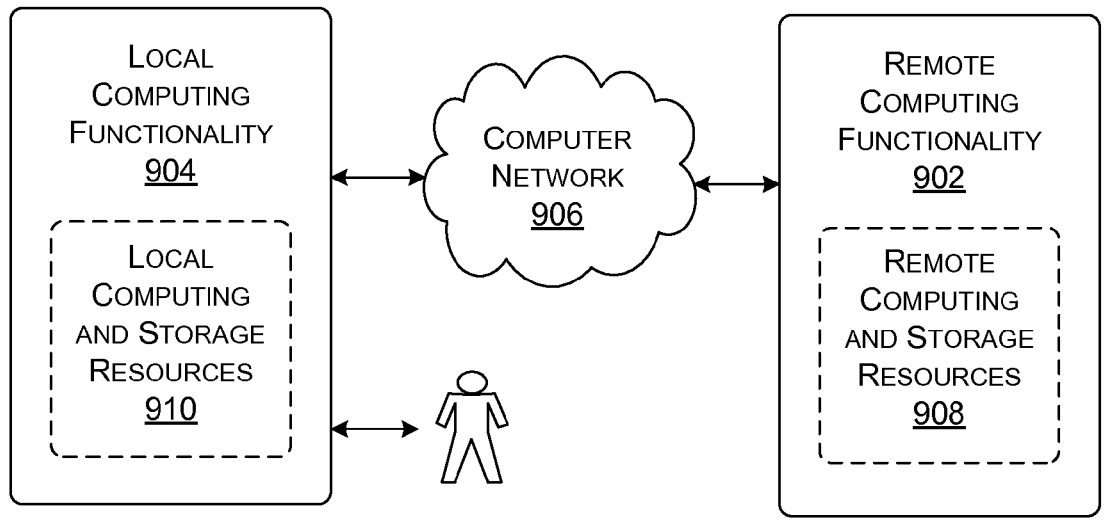
FIG. 9 shows computing equipment that can be used to implement any aspect of the computer system of FIG. 1.

Jumping ahead momentarily in the sequence of figures, FIG. 9 shows computing equipment which represents one implementation of the computer system 102 of FIG. 1. The computing equipment may include any combination of remote computing functionality 902 and local computing functionality 904, coupled together via a computer network 906. The remote computing functionality 902 may rely on remote computing and storage resources 908, while the local computing functionality 904 may rely on local computing and storage resource 910.

More specifically, the remote computing functionality 902 may correspond to one or more server computing devices and associated data stores (e.g., corresponding to a cloud computing infrastructure). With respect to a particular user who interacts with the computing equipment, the local computing functionality 904 may correspond to any user computing device, such as a traditional stationary personal computing device, any kind of mobile computing device (e.g., a smartphone, tablet computing device, etc.), a game console device, a set-top box device, and so on. The computer network 906 may correspond to a local area network, a wide area network (e.g., the Internet), one or more point-to-point links, and so on. Section C (below) provides further illustrative details regarding one possible implementation of the computing equipment of FIG. 9.

In one non-limiting allocation of functions, the remote computing functionality 902 may implement all components of the computer system 102 shown in FIG. 1, including the training system 106 and the application environment 110. The local computing functionality 904 may provide a mechanism through which an end user may interact with the application environment 110, e.g., by submitting linguistic items to the application environment 110, and receiving output results generated by the application environment 110. In another implementation, the local computing functionality 904 may implement selected parts of the training system 106 and/or the application environment 110. For example, a locally-implemented action-taking module 114 can receive a label from the remotely-implemented NL-KL classifier module 112, and perform some action based on that label.

A.2. Training System

Figure 2:
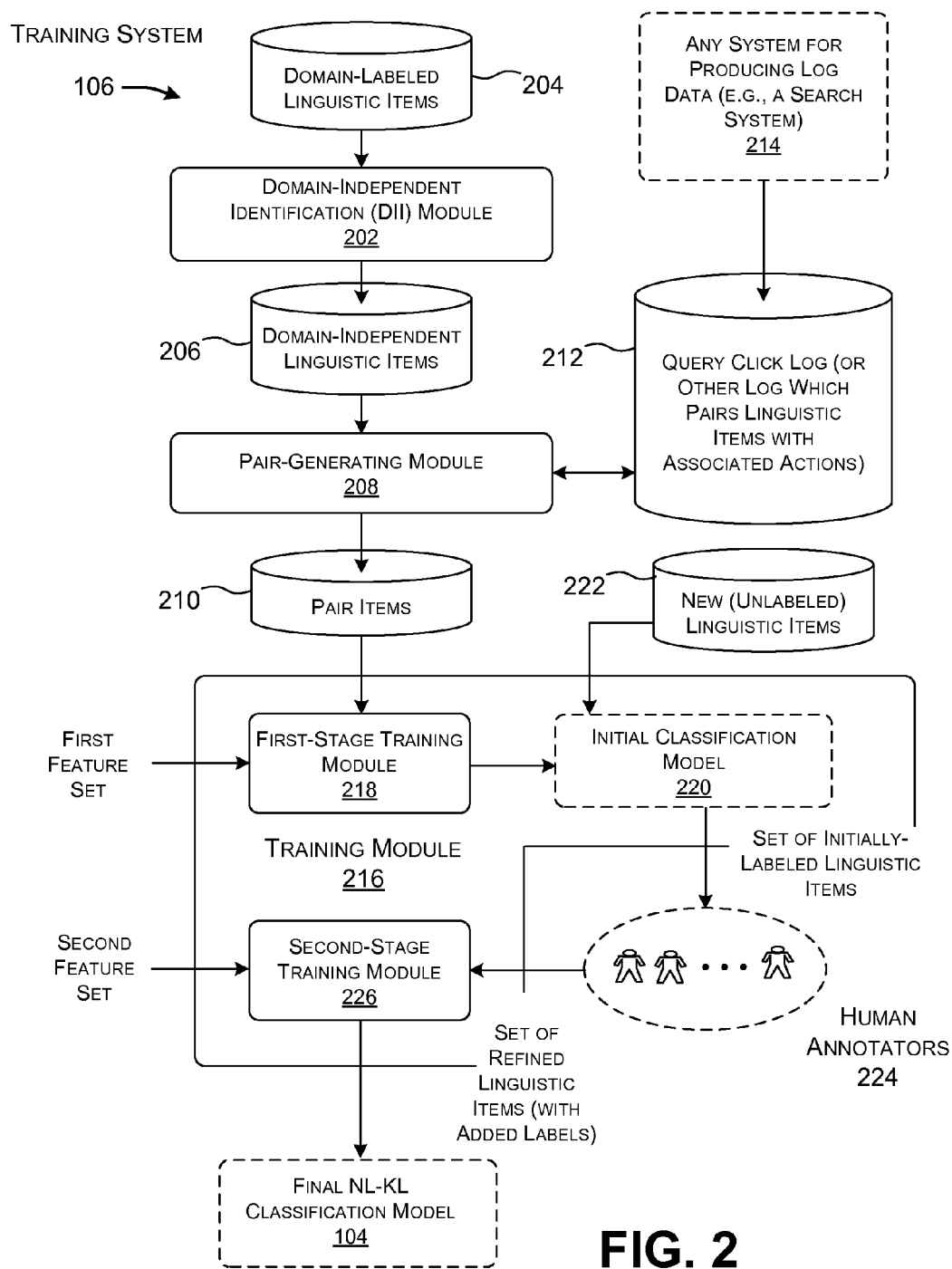
FIG. 2 shows a training system which can be used in the computer system of FIG. 1 to generate the NL-KL classification model.

FIG. 2 shows one implementation of the training system 106, introduced in the context of FIG. 1. To begin with, a domain-independent identification (DII) module 202 operates on a set of domain-labeled linguistic items (which may be stored in one or more data stores 204), to produce a set of domain-independent linguistic items (which may be stored in one or more data stores 206).

In one case, the domain-labeled linguistic items may correspond to queries or other linguistic expressions that humans have previously submitted to some system, such as a spoken language understanding (SLU) system. One or more human annotators may have annotated the linguistic items with respective domain labels. For example, an annotator may have applied the label "driving directions" to an inquiry "Show me directions to Seattle's airport." Alternatively, or in addition, an automated system of any type may have applied the domain labels to the linguistic items that make up the domain-labeled linguistic items.

Each domain-independent linguistic item expresses a linguistic construction that is common across several domains. For example, several of the domain-labeled linguistic items may start off with the phrasing, "Show me all of the . . . ". As such, the DII module 202 may identify this phrasing as one of the domain-independent linguistic items.

More specifically, the DII module 202 can use various techniques to identify the set of domain-independent linguistic items. In one approach, the DII module 202 computes a probability distribution over domains for each n-gram $n_j$ in the set of domain-labeled linguistic items, expressed as $P(d_i|n_j)$, where $d_j$ is one of the domains in a set of domains D. The DII module 202 can then compute the Kullback-Leibler (K.L.) divergence between this distribution and the prior probabilities over all domains ($P(d_i)$):

$$S(n_j)=K.L.(P(d_i|n_j)\|P(d_i)) \quad (1).$$

Using this equation, the DII module 202 identifies a subset of n-grams having the least divergence from the prior distribution. The linguistic items associated with these n-grams correspond to the set of domain-independent linguistic items.

A pair-generating module 208 operates on the domain-independent linguistic items to produce a set of pair items, which it may store in one or more data stores 210. Each pair item corresponds to a pairing of an NL linguistic item and an associated KL linguistic item that expresses the same intent. For example, one pair item may include the NL linguistic item "What are the signs of diabetes?" and the corresponding KL linguistic item "diabetes symptoms."

The pair-generating module 208 may leverage a query click log 212 to produce the pair items. In one case, the query click log 212 identifies a plurality of queries submitted by users to a commercial search system 214, such as the Binge search system provided by Microsoft® Corporation of Redmond, Wash. The query click log 212 also identifies the selections (e.g., clicks, purchases, mouse hovers, etc.) made by users in response to the queries. For example, suppose a particular user inputs the query "Closet planet, earth," causing the search system 214 to generate a list of matching search result items. Then suppose that the user clicks on or otherwise shows interest in one of the search result items, corresponding to a particular uniform resource locator (URL) u. The query click log entry for this transaction will identify at least the user's query, together with the URL that the user selected in response to the query. As a whole the query click log data can be expressed as a bipartite graph.

More generally stated, the pair-generating module 208 can use any log data which associates linguistic items submitted by users with actions taken by users in response to those linguistic items. For example, other log data may identify questions posed by users to an automated help service, and the links clicked by users in response to the questions.

The operation of the pair-generating module 208 will be described in more detail in the course of the explanation of FIG. 3, below. By way of overview, the pair-generating module 208 identifies a set of matching linguistic items in the query click log 212 that match any of the domain-independent linguistic items. These matching linguistic items correspond to the NL linguistic item components of the pair items. Then the pair-generating module 208 leverages the query click log 212 to identify a set of linked linguistic items which are related to the matching linguistic items. As will be described below in greater detail, the linked linguistic items are related to the matching linguistic items by virtue of common actions taken by users in response to submitting these linguistic items.

At this juncture, a training module 216 uses a machine learning approach to produce the NL-KL classification model 104 based, in part, on the set of pair items. According to one illustrative and non-limiting approach, the training module 216 generates the NL-KL classification model 104 in three phases. In a first phase, a first-stage training module 218 uses a first machine learning technique to generate an initial classification model 220. The initial classification model 220 performs the same role as the final NL-KL classification model 104, that is, by determining whether an input linguistic item is an NL linguistic item or a KL linguistic item.

In an active learning phase, the training module 216 uses the initial classification model 220 to label a set of new (unlabeled) linguistic items (provided in one or more data stores 222), that is by automatically applying the label NL or KL to each entry in this data set. This operation yields a set of initially-labeled linguistic items. The training module 216 then selects a subset of the initially-labeled linguistic items and presents the subset to a group of human annotators 224, who are instructed to independently determine, based on their human judgment, whether each linguistic item in the subset corresponds to an NL linguistic item or KL linguistic item. This operation yields a set of refined linguistic items, corresponding to the linguistic items in the subset together with the labels applied by the human annotators 224.

In the third phase of its operation, a second-stage training module 226 applies a second machine learning technique to produce the final NL-KL classification model 104, based on the set of refined linguistic items.

The first-stage training module 218 and the second-stage training module 226 can use any machine learning technology to produce their respective models. Illustrative techniques include linear classifiers of any type (such as logistic regression classifiers), boosting algorithm classifiers, neural networks, and so on. For example, a boosting algorithm successively learns a collection of weak learners, and then produces a final model which combines the contributions of the individual weak learners. The boosting algorithm adjusts the weights applied to the training data at each iteration, to thereby place focus on examples that were incorrectly classified in a prior iteration of the algorithm.

The first-stage training module 218 generates the initial classification model 220 based on a first set of features, while the second-stage training module 226 generates the final NL-KL classification model 104 using a second set of features. The first set of features may include lexical features and structural features, while the second set of features may include lexical features, structural features, and semantic features.

The lexical features identify the presence of particular word n-grams in the training data (e.g., in the set of pair items). The structural features describe other characteristics of the linguistic items beyond the n-gram themselves, such as the lengths of the linguistic items. The semantic features characterize the type of content in the linguistic items. For example, some semantic features may identify the presence of quotes, titles, lyrics, etc. in the linguistic items. This type of non-NL content may resemble natural language information, but a user may be inputting this information in the form of a keyword query, not a natural language query. Other semantic features may identify the presence of profanity in the linguistic items. The training module 216 can consult a variety of lookup resources (not shown) to determine the values of different types of semantic features, with respect to each linguistic item in the training set. For example, the lookup resources may include dictionaries which identify quotes, titles, lyrics, profanity words, etc.

Figure 5:
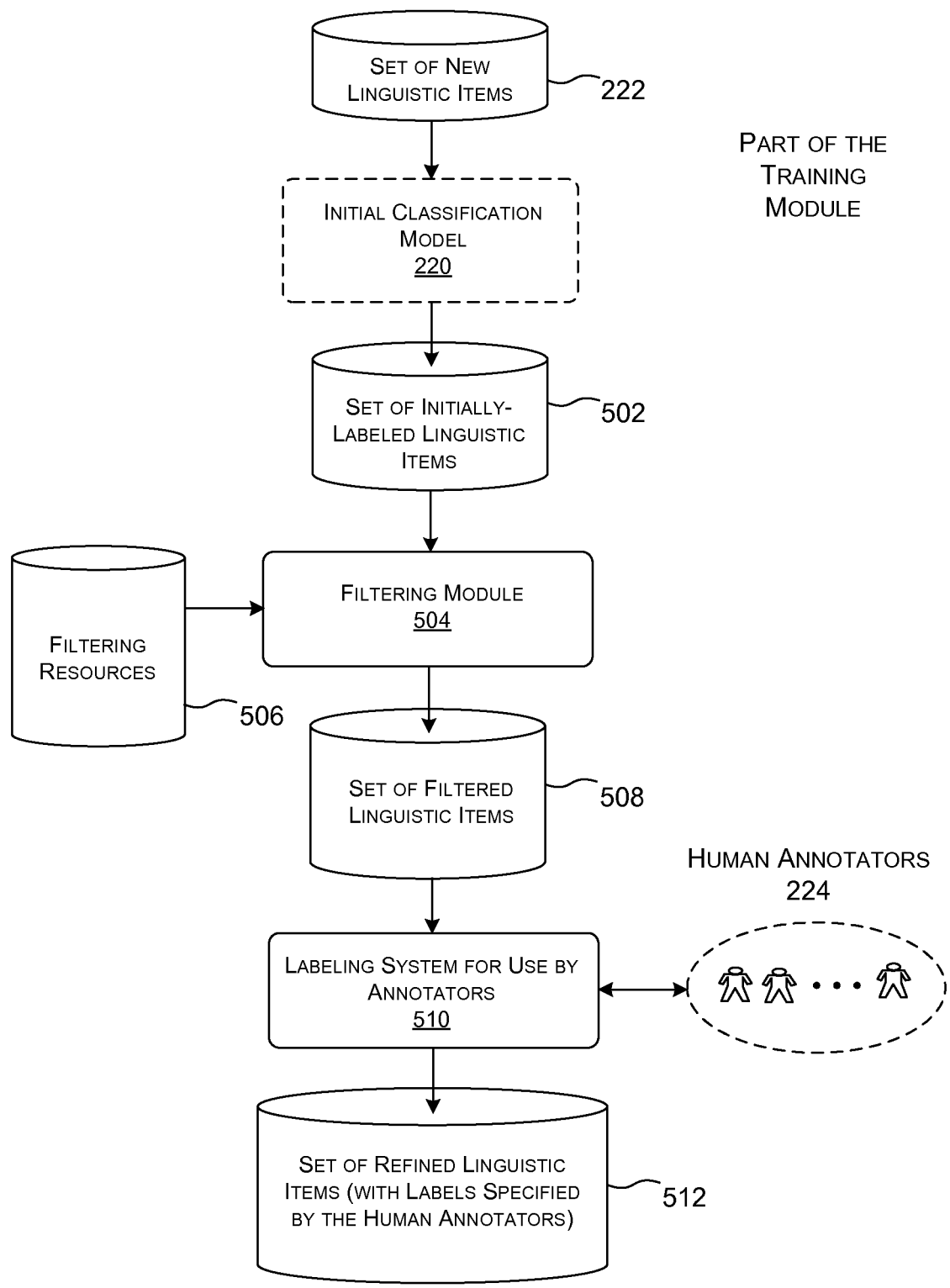
FIG. 5 shows further details of the training system of FIG. 2, in an active learning phase of operation.

Overall, the training system 106 leverages the contribution of human annotators 224 to improve the quality of the initial classification model 220. FIG. 5 and the accompanying explanation (below) provide further details regarding this active learning phase of the training system 106.

Figure 3:
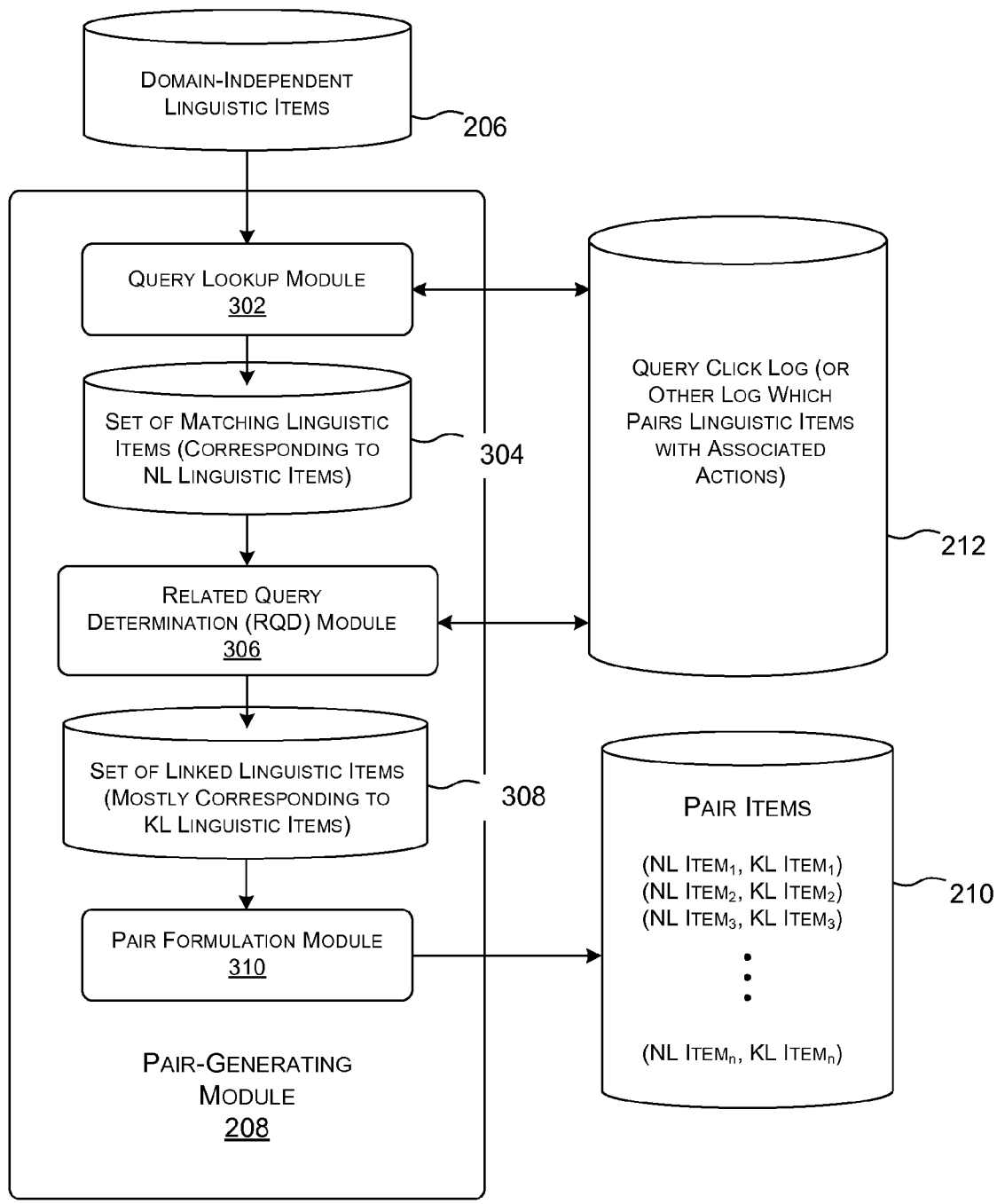
FIG. 3 shows further illustrative details of a pair-generating module that is used to generate pair items. The pair-generating module is a component of the training system of FIG. 2.

FIG. 3 shows further illustrative details regarding the pair-generating module 208, which processes the set of domain-independent linguistic items to produce the set of pair items. In a first operation, a query lookup module 302 determines a set of matching linguistic items from the query click log 212 (or other log resource), each of which matches at least one of the domain-independent linguistic items. For example, suppose that one domain-independent linguistic item corresponds to the phrase "Show me how to _." As one matching entry, the query lookup module 302 may find the following matching linguistic item, "Show me how to build a deck," which corresponds to an actual query submitted by a user. The lookup module 302 may store the set of matching linguistic items in one or more data stores 304. Each matching linguistic item is considered an NL linguistic item because it matches a domain-independent phrase which is expressed in a natural language.

A related query determination (RQD) module 306 may determine a set of linked linguistic items that are related to the set of matching linguistic items. In one implementation, an NL linguistic item is related to a corresponding KL linguistic item if both items are associated with the same behavior by users who submit these items as queries. The users may exhibit the same behavior, for instance, when they click on or otherwise select the same web sites after submitting the two types of queries. As an approximation, the linguistic item that is linked to an NL linguistic item via common behavior of the above-described nature is considered (by default) to be a KL linguistic item, since only a small percentage of queries submitted to a search engine correspond to NL linguistic items, and therefore the linked linguistic item that is discovered most likely corresponds to a KL linguistic item, not an NL linguistic item. This assumption may not always be true, but the number of times that this assumption fails does not significantly affect the quality of the data set produced by the pair-generating module 208.

More formally stated, the similarity between an NL linguistic item $q_k^{(NL)}$ and a KL linguistic item $q_i^{(KL)}$ can be expressed as follows:

$$sim(q_k^{(NL)}, q_i^{(KL)}) = \sum_j P(q_i^{(KL)} | u_j) \times P(u_j | q_k^{(NL)}). \qquad (2)$$

In this equation, $u_j$ corresponds to a URL (or other identifier) associated with a selection made by a user. $P(q_i^{(KL)}|u_j)$ describes the probability, given that the user clicked on site $u_j$, that he or she preceded this action by entering the KL query $q_i^{(KL)}$. $P(u_j|q_k^{(NL)})$ corresponds to the probability that, given that the user entered NL query $q_k^{(NL)}$, he or she subsequently clicked on the site $u_j$. These individual probability measures can be computed based on corresponding count information maintained by, or derivable from, the query click log 212. The similarity measure of Equation (2) is formed by computing the product of the two probabilities described above with respect to all candidate sites j∈J. Stated in other terms, Equation (2) amounts to performing a two-step walk on a query click graph.

Computing similarity measures using Equation (2) with respect to all possible URLs is a time-intensive and processor-intensive task. As a quicker approximation, the RQD module 306 can find, for each matching linguistic item $q_k^{(NL)}$, the URL û that has the maximum click probability, given by:

$$û = \mathrm{argmax}_u P(u|q_k^{(NL)}) \qquad (3).$$

The similarity between an NL linguistic item and a KL linguistic item can then be approximated as:

$$sim(q_k^{(NL)}, q_i^{(KL)}) = P(q_i^{(KL)}|û) \times P(û|q_k^{(NL)}) \qquad (4).$$

The RQD module 306 can apply Equation (4) to each NL linguistic item in the set of matching linguistic items to identify one or more corresponding KL linguistic items (having respective high similarity measures). Overall, this yields a set of linked linguistic items, which the RQD module 306 can store in one or more data stores 308.

A pair formulation module 310 can form the set of pair items based on the set of matching linguistic items and the set of linked linguistic items. For example, the pair formulation module 310 can select a subset of the pair items having the highest measures of similarity (based on the assessments of similarity given by Equation (4)).

Figure 4:
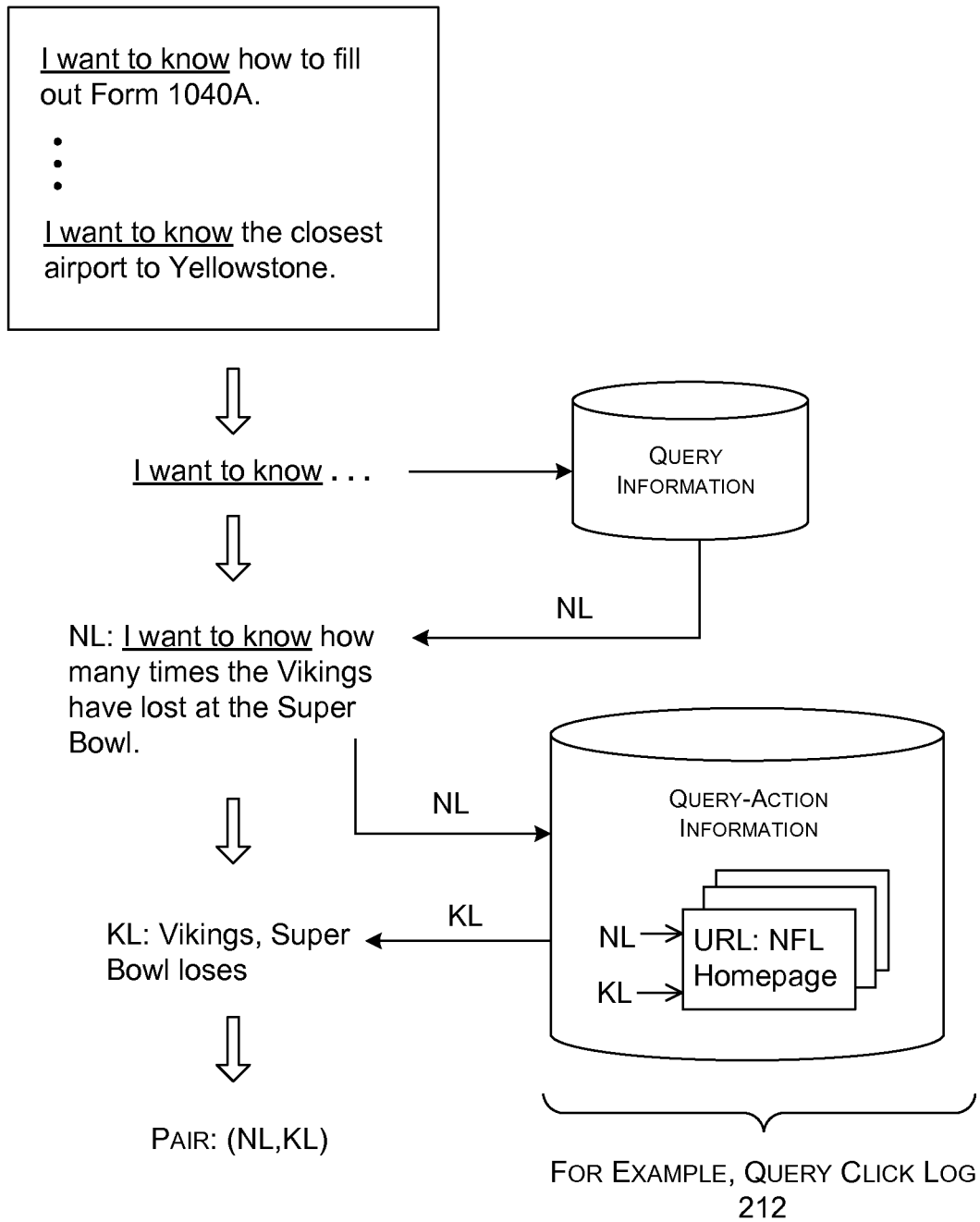
FIG. 4 shows an example of the operation of the training system of FIG. 2.

FIG. 4 summarizes the operation of the DII module 202 and the pair-generating module 208 with respect to a particular example. Here, the set of domain-labeled linguistic items includes two or more linguistic items that use the phrasing, "I want to know . . . " For example, a first linguistic item may ask, "I want to know how to fill out Form 1040A," while a second linguistic item may ask, "I want to know the closest airport to Yellowstone." In response to this data, the DII module 202 identifies the domain-independent linguistic item, "I want to know . . . ," among other possible domain-independent linguistic items.

The query lookup module 302 (of the pair-generating module 208) searches the query click log 212 for the identified domain-independent phrase "I want to know," finding at least the following query: "I want to know how many times the Vikings have lost at the Super Bowl." That query constitutes the NL linguistic item associated with a pair item. The RQD module 306 then uses Equation (4) to find at least one KL linguistic item that has high similarity to the identified NL linguistic item. Assume that the RQD module 306 finds the KL linguistic item: "Vikings, Super Bowl loses." That KL linguistic item is related to the NL linguistic item because users frequently clicked on the same web site after submitting these two queries, such as a web site sponsored by the National Football League, etc.

Advancing to FIG. 5, this figure provides further details regarding the active learning phase of the processing performed by the training system 106. As previously explained, the training module 216 uses the initial classification model 220 to apply labels to a set of new linguistic items, which may correspond to unlabeled queries extracted from the query click log 212. This yields a set of initially-labeled linguistic items, stored in one or more data stores 502.

A filtering module 504 may select a subset of the set of initially labeled linguistic items for presentation to the human annotators 224, based on any filtering criteria. In one case, for example, the filtering module 504 can select a prescribed number of NL linguistic items having high confidence scores (as assessed with respect to some application-specific threshold), and a prescribed number of KL linguistic items having high confidence scores (as assessed with respect to some application-specific threshold). Alternatively, or in addition, the filtering module 504 can select NL and KL linguistic items that have low confidence scores (as assessed with respect to some application-specific threshold(s)).

Further, the filtering module 504 can remove NL linguistic items that contain prohibited content, such as quotes, lyrics, titles, profane words and phrases, and so on. The filtering module 504 can consult any filtering resources (such as dictionaries, etc.), provided in one or more data stores 506, to identify prohibited content in the NL linguistic items. Overall, the operation of the filtering module 504 yields a set of filtered linguistic items that may be stored in one or more data stores 508.

A labeling system 510 can disseminate the set of filtered linguistic items to the human annotators 224, with or without the initial labels identified by the initial classification model 220. One implementation of the labeling system 510 is the Mechanical Turk framework provided by Amazon.com, Inc. of Seattle, Wash. The annotators 224 manually label each linguistic item in this set as either an NL linguistic item or a KL linguistic item, based on their independent judgment. The linguistic items given to the human annotators 224, together with the labels applied by the annotators 224, constitute a set of refined linguistic items, which may be stored in one or more data stores 512. The labeling system 510 may remove any linguistic item in the set of refined linguistic items if there is disagreement among annotators 224 as to whether to label it as NL or KL.

A.3. Application Environments

Figure 6:
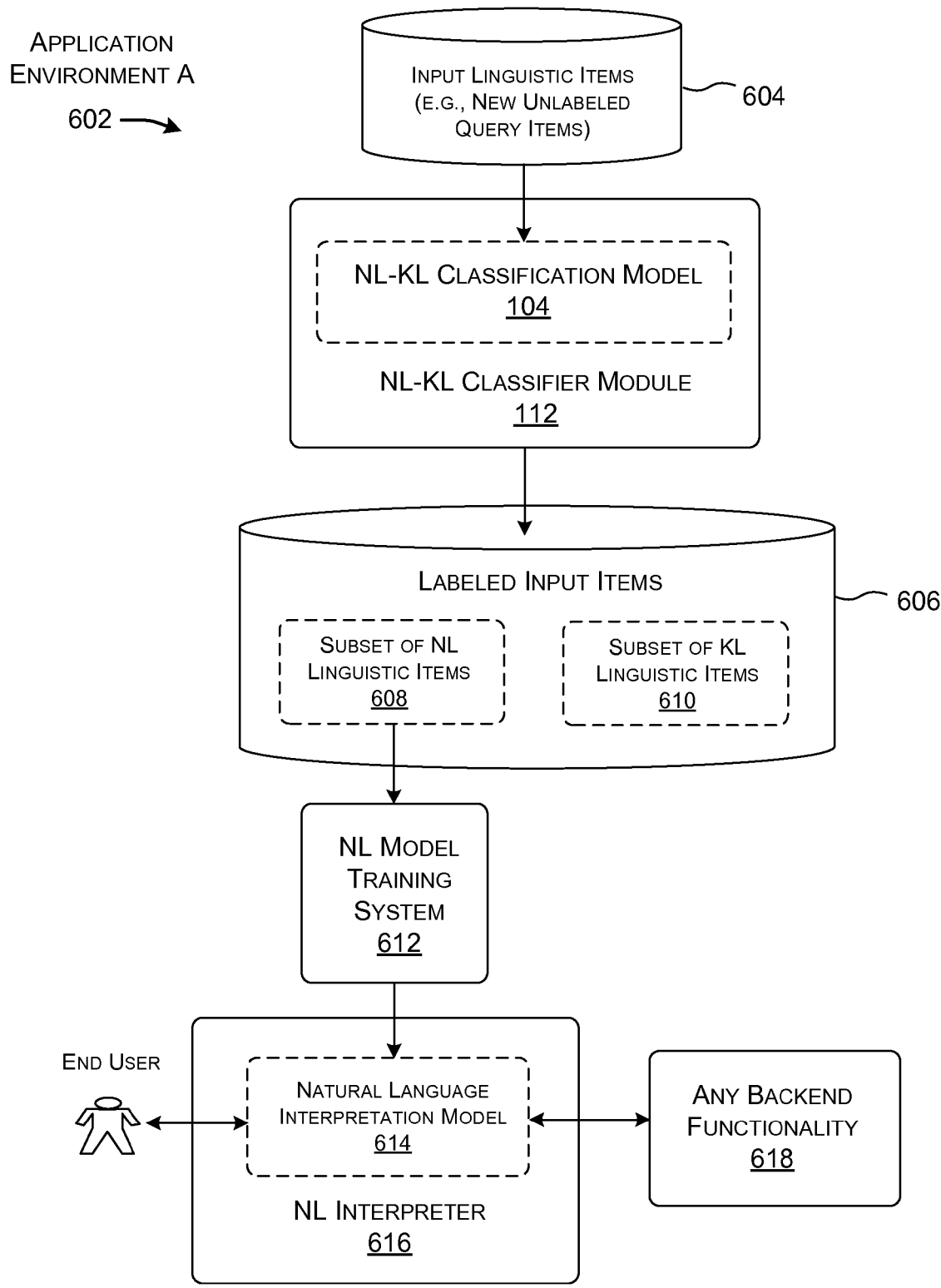
FIGS. 6-8 show three respective applications of the NL-KL classification model.

FIG. 6 shows one application environment 602 for applying the NL-KL classification model 104. The classification model 104 may be produced using the technique described in Subsection A.2, or by some other technique. In this environment 602, the NL-KL classifier module 112 receives a set of input linguistic items from one or more data stores 604. The input linguistic items may originate from any source, such as the query click log of a search system. The NL-KL classifier module 112 then uses the NL-KL classification model 104 to label each input linguistic item as an NL linguistic item or a KL linguistic item. The NL-KL classifier module 112 can store the labeled items in one or more data stores 606. More specifically, the labeled items correspond to a subset of NL linguistic items 608 and a subset of KL linguistic items 610.

A natural language (NL) model training system 612 may then use any machine learning technique described above to generate a natural language (NL) interpretation model 614, such as a spoken language understanding (SLU) model. An NL interpreter 616 may use the NL interpretation model 614 to interpret a natural language utterance of an end user. The NL interpreter 616 can also interact with any backend functionality 618 based on its interpretation of the end user's utterance. For example, the NL interpreter 616 can submit a machine-level query to a database system based on its interpretation of the end user's utterance.

The filtering operation performed by the NL-KL classification model 104 improves the quality of the training data fed to the NL model training system 612, which, in turn, may improve the accuracy of the NL interpretation model 614 that is produced using the training data. In other words, the purpose of the NL interpretation model 614 is to interpret natural language utterances; because of this, NL training data is more relevant to the operation of the NL interpretation model 614 than KL training data. In this sense, the KL training data may be regarded as "noise," or at least non-preferred training data. The application environment 602 of FIG. 6 is effective in removing the non-preferred KL content from the initial set of linguistic items. For a typical collection of queries submitted to a search system, the KL linguistic items may far outnumber the NL linguistic items, so there may be a relatively large amount of such non-preferred KL content in the initial set of linguistic items.

Figure 7:
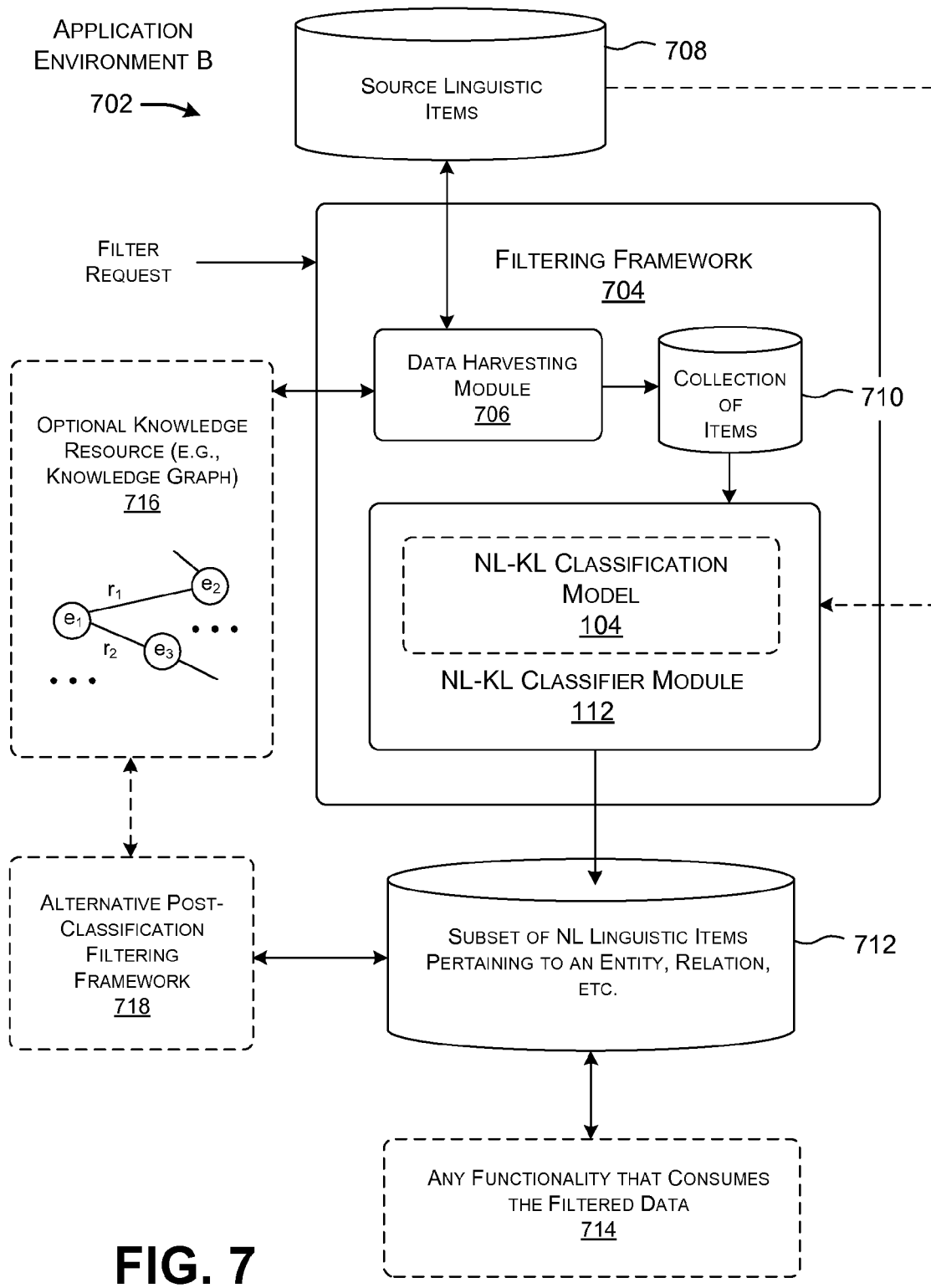

FIG. 7 shows another application environment 702 for applying the NL-KL classification model 104. In this environment 702, a filtering framework 704 receives a filter request from a user or from another system or automated agent. The filter request may specify a filtering condition pertaining to an entity and/or a relation pertaining to one or more entities. For example, a user may input a filter request which asks the filtering framework 704 to cull NL linguistic items pertaining to a particular company name. Or the user may input a filter request which asks the filtering framework 704 to identify NL linguistic items that pertain to properties having a particular relationship, such as a particular owner, and so on.

In response to the filter request, a data harvesting module 706 can form a collection of linguistic items that satisfy the filter request, selected from a larger collection of source linguistic items. The source linguistic items, for instance, may correspond to queries extracted from a query click log or some other source. The source linguistic items can be stored in one or more data stores 708, and the collection of linguistic items produced by the data harvesting module 706 can be stored in one or more data stores 710.

The NL-KL classifier module 112 then filters the collection of linguistic items in the manner set forth above with respect to FIG. 6, e.g., by producing a subset of NL linguistic items (which may be stored in one or more data stores 712), and a subset of KL linguistic items (not shown). In this context, however, the labeled linguistic items particularly focus on a specified entity (or entities) or relation (or relations). Any functionality 714 can consume the labeled linguistic items in any manner. For example, machine learning technology can generate a model based on the subset of NL linguistic items, as in the example of FIG. 6.

In one implementation, the data harvesting module 706 can rely on a knowledge resource 716 to generate the collection of linguistic items. The knowledge resource 716 may correspond to any data structure which describes entities and the relations among the entities. For instance, the knowledge resource 716 may correspond to a knowledge graph which represents entities as nodes in a graph and relations as links which connect the nodes together. As an example of how the knowledge resource 716 can be used, consider the above-identified scenario in which a user wishes to identify all natural language linguistic items regarding properties owned by a particular person. The data harvesting module 706 can first interrogate the knowledge resource 716 to identify the properties associated with this person. The data harvesting module 706 can then mine the source linguistic items to find all linguistic items that match at least one of these properties. The NL-KL classifier module 112 then filters out all of the KL linguistic items from this data set.

Alternatively, or in addition, the NL-KL classifier module 112 can operate on the original source linguistic items. A post-classification filtering framework 718 can then cull those NK linguistic items and/or KL linguistic items which also satisfy the filter request. In other words, the filtering operation in this implementation is performed after the NL-KL classification task, rather than (or in addition to) before the NL-KL classification task.

Figure 8:
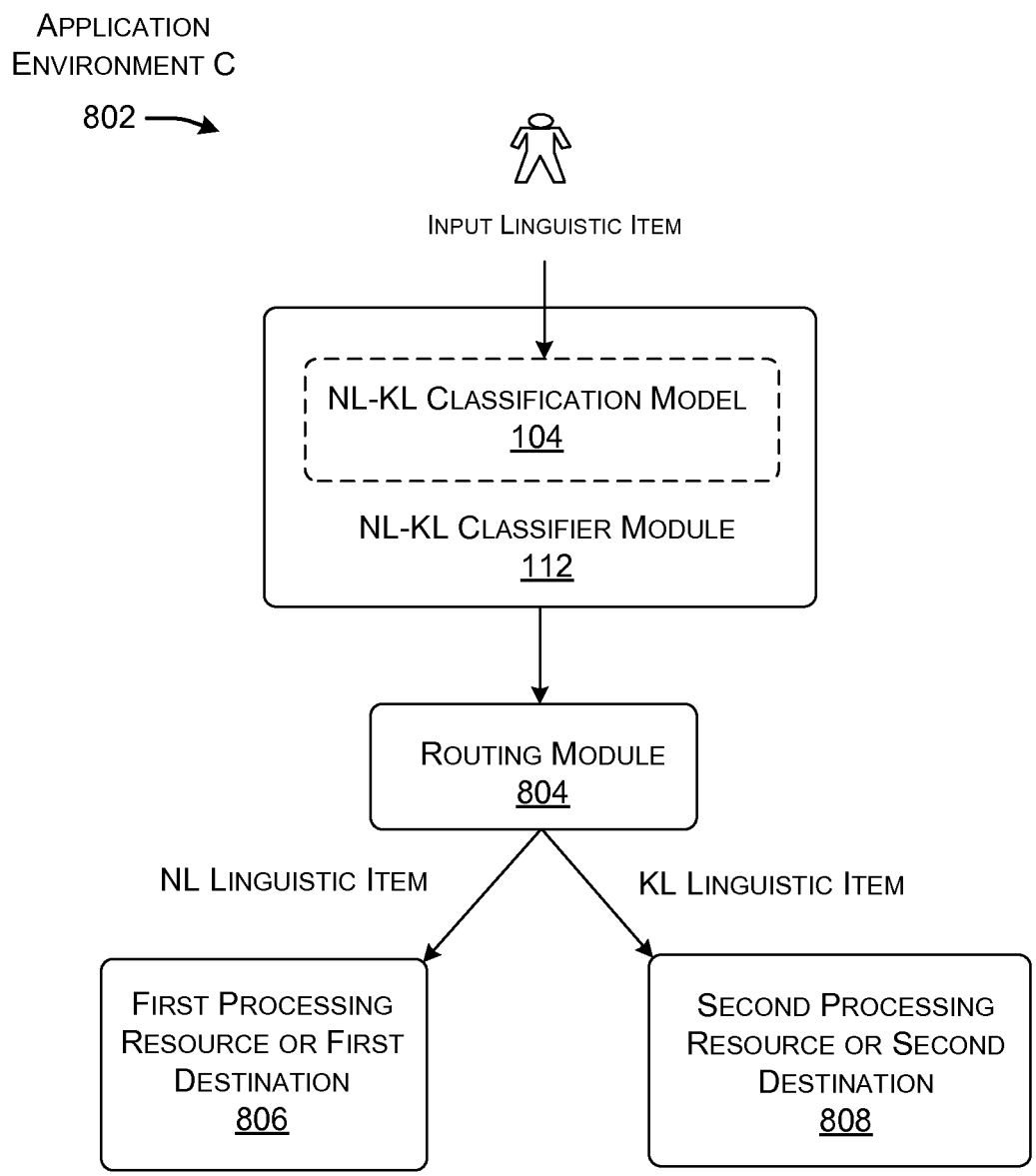

FIG. 8 shows another application environment 802 for applying the NL-KL classification model 104. In this case, the NL-KL classifier module 112 uses the NL-KL classification model 104 to categorize an input linguistic item as either an NL linguistic item or a KL linguistic item. The application environment 802 can then perform a first action if the input item is an NL linguistic item, and perform a second action if the input item is an NL linguistic item.

For example, a routing module 804 can route the input linguistic item to a first processing resource or a first destination 806 if it corresponds to an NL linguistic item. Alternatively, the routing module 804 can route the input linguistic item to a second processing resource or a second destination 808 if it corresponds to a KL linguistic item. To cite one example, a search system can use the functionality of FIG. 8 to determine whether a user who has submitted a query is attempting to express his or her intent using a natural language. If so, the search system can route the user's query to functionality that is most appropriately suited for processing the user's request. Alternatively, the search system can route the user's query to a human assistant, based on the assumption that the user prefers to interact with the search system in a conversational form, and therefore may prefer to speak with a human.

Still other application environments can leverage the use of the NL-KL classification model 104. The above three frameworks are cited by way of example, not limitation.

B. Illustrative Processes

FIG. 10-15 shows procedures that explain one manner of operation of the computer system 102 of FIG. 1. Since the principles underlying the operation of the computer system 102 have already been described in Section A, certain operations will be addressed in summary fashion in this section.

Figure 10:
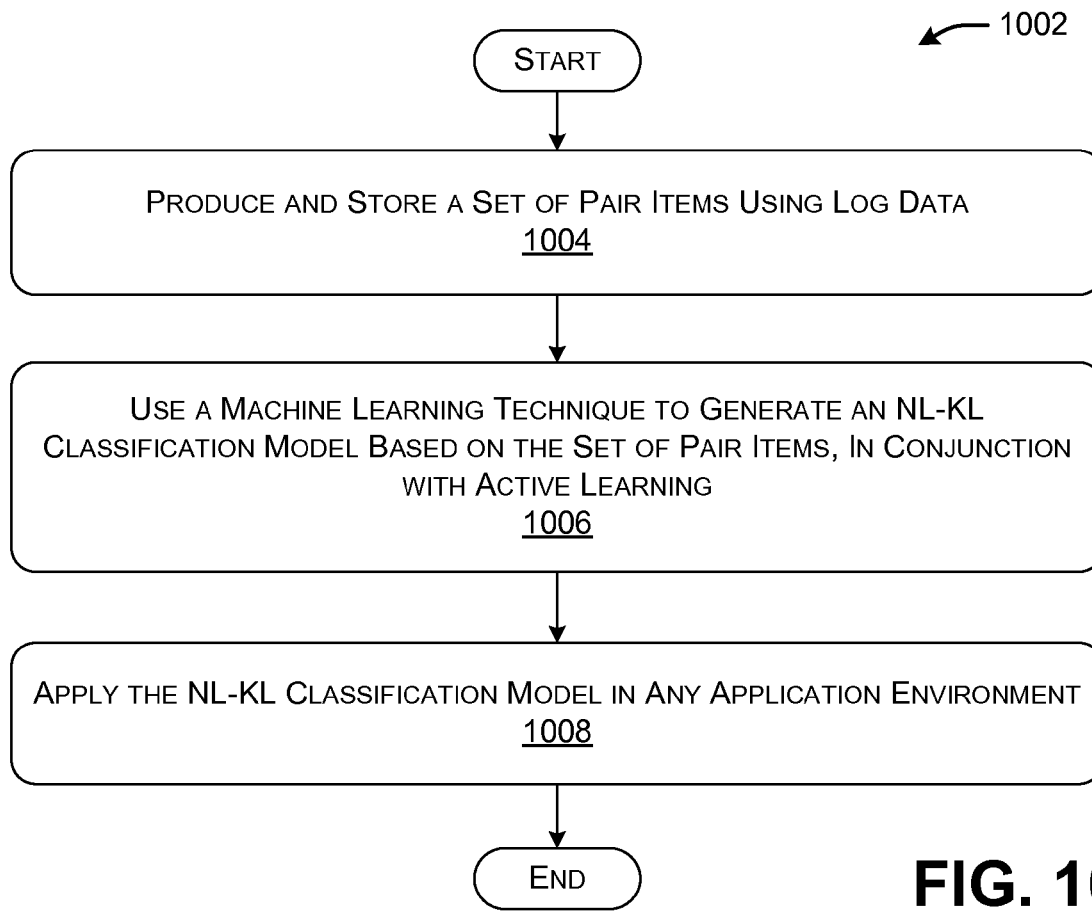
FIG. 10 is a procedure which provides an overview of one manner of operation of the computer system of FIG. 1.

To begin with, FIG. 10 shows a procedure 1002 which provides an overview of one manner of operation of the computer system 102 of FIG. 1. In block 1004, the computer system 102 produces and stores a set of pair items using any kind of log data, such as query click log data. Each pair item in the set of pair items includes: (a) a natural language (NL) linguistic item, which expresses an intent using natural language; and (b) a keyword language (KL) linguistic item, which expresses the intent using one or more keywords, and is related to the NL query item. In block 1006, the computer system 102 uses a machine learning technique to generate an NL-KL classification model based on the set of pair items provided in block 1004 (and based on active learning processing, to be described below). As set forth in Section A, the NL-KL classification model is configured to identify whether an input linguistic item corresponds to either an NL linguistic item or a KL linguistic item. In block 1008, the computer system applies the NL-KL classification model in any application environment.

Figure 11:
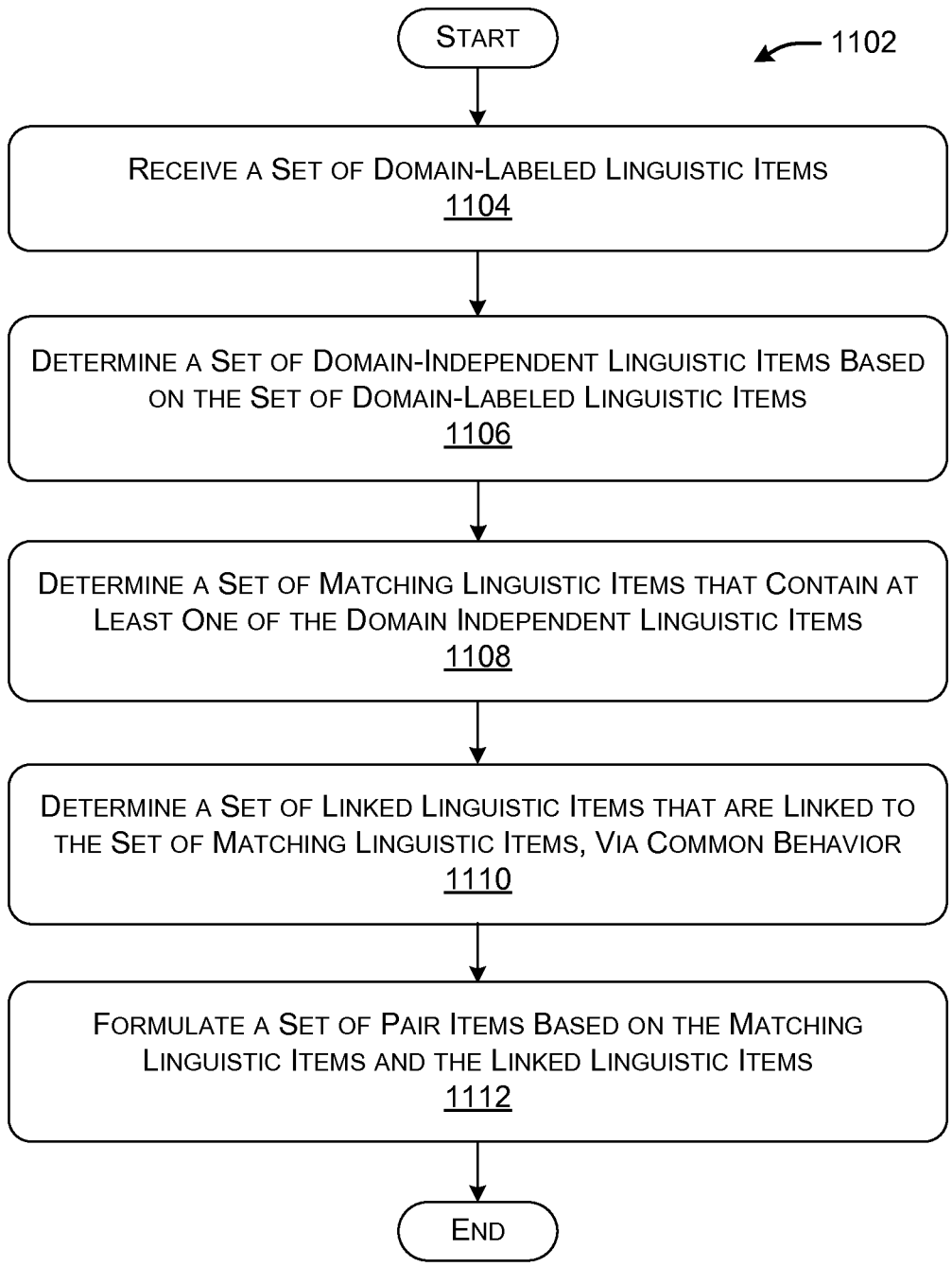
FIG. 11 is a procedure which describes one manner of operation of a first part of the training system of FIG. 2.

FIG. 11 shows a procedure 1102 which describes one manner of operation of a first part of the training system 106 of FIG. 2. In block 1104, the training system 106 receives a set of domain-labeled linguistic items. In block 1106, the training system 106 determines a set of domain-independent linguistic items based on the set of domain-labeled linguistic items. In block 1108, the training system 106 determines a set of matching linguistic items, selected from log data, that contain at least one domain-independent linguistic item from the set of domain-independent linguistic items. In block 1110, the training system 1110 determines a set of linked linguistic items that are linked to the set of matching linguistic items, based on common behavior reflected in the log data. In block 1112, the training system 106 formulates the set of pair items based on the set of matching linguistic items (produced in block 1108) and the set of linked linguistic items (produced in block 1110).

Figure 12:
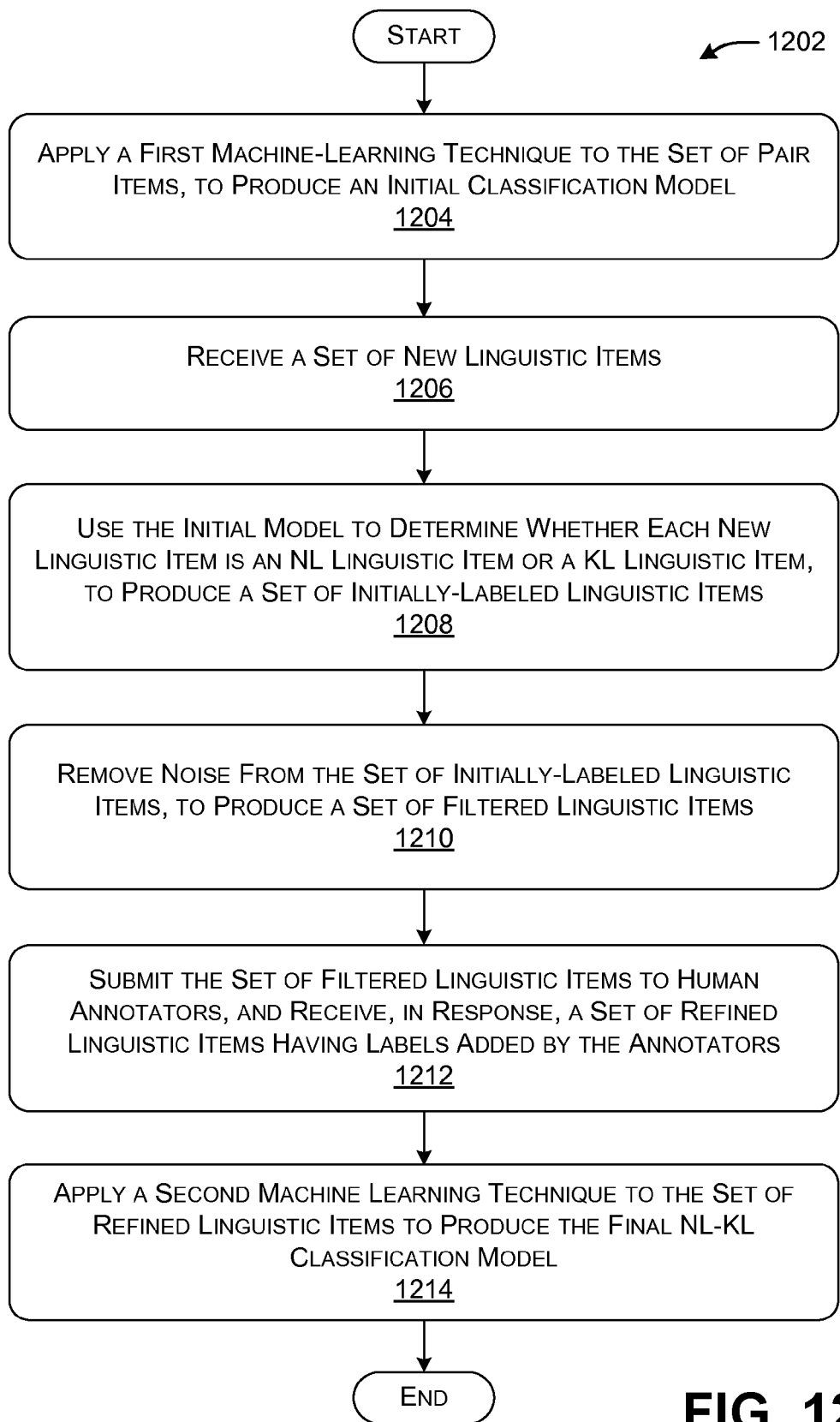
FIG. 12 is a procedure which describes one manner of operation of a second part of the training system of FIG. 2.

FIG. 12 shows a procedure 1202 which describes operations performed by a second part of the training system 106. In block 1204, the training system 106 applies a first machine learning technique to the set of pair items, to produce an initial classification model 220. In block 1206, the training system 106 receives a new set of linguistic items, such as a new set of queries extracted from query click log data. In block 1208, the training system 106 uses the initial classification model 220 to determine whether each new linguistic item in the set of new linguistic items is an NL linguistic item or a KL linguistic item, to produce a set of initially-labeled linguistic items. In block 1210, the training system 106 selects a subset of the initially-labeled linguistic items and removes noise from the set of initially-labeled linguistic items, to produce a set of filtered linguistic items. In block 1212, the training system 106 receives added labels for at least part of the set of filtered linguistic items, provided by human annotators 224, to produce a set of refined linguistic items. In block 1214, the training system 106 applies a second machine learning technique based on the set of refined linguistic items, to produce the NL-KL classification model 104.

Figure 13:
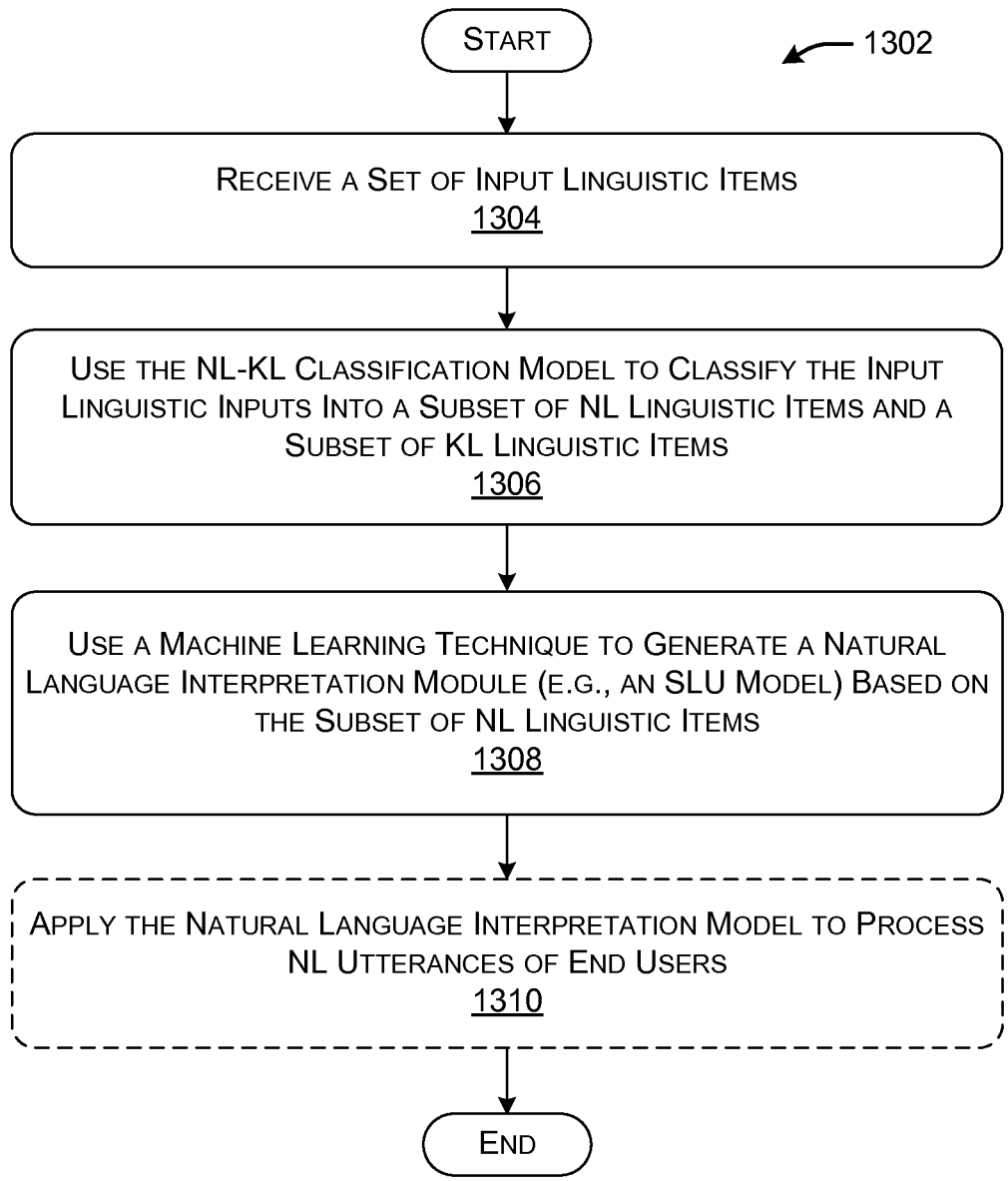
FIG. 13 is a procedure which describes one manner of applying the NL-KL classification model, corresponding to the functionality of FIG. 6.

FIG. 13 shows a procedure 1302 which describes one manner of applying the NL-KL classification model 104, corresponding to the functionality of FIG. 6. In block 1304, the computer system 102 receives a set of input linguistic items. In block 1306, the computer system 102 uses the NL-KL classification model 104 to classify each of the input linguistic items as either an NL linguistic item or a KL linguistic item, to produce, overall, a subset of NL linguistic items and a subset of KL linguistic items. In block 1308, the computer system 102 uses a machine learning technique to generate a natural language interpretation model, such as a SLU model, based on the subset of NL linguistic items.

Figure 14:
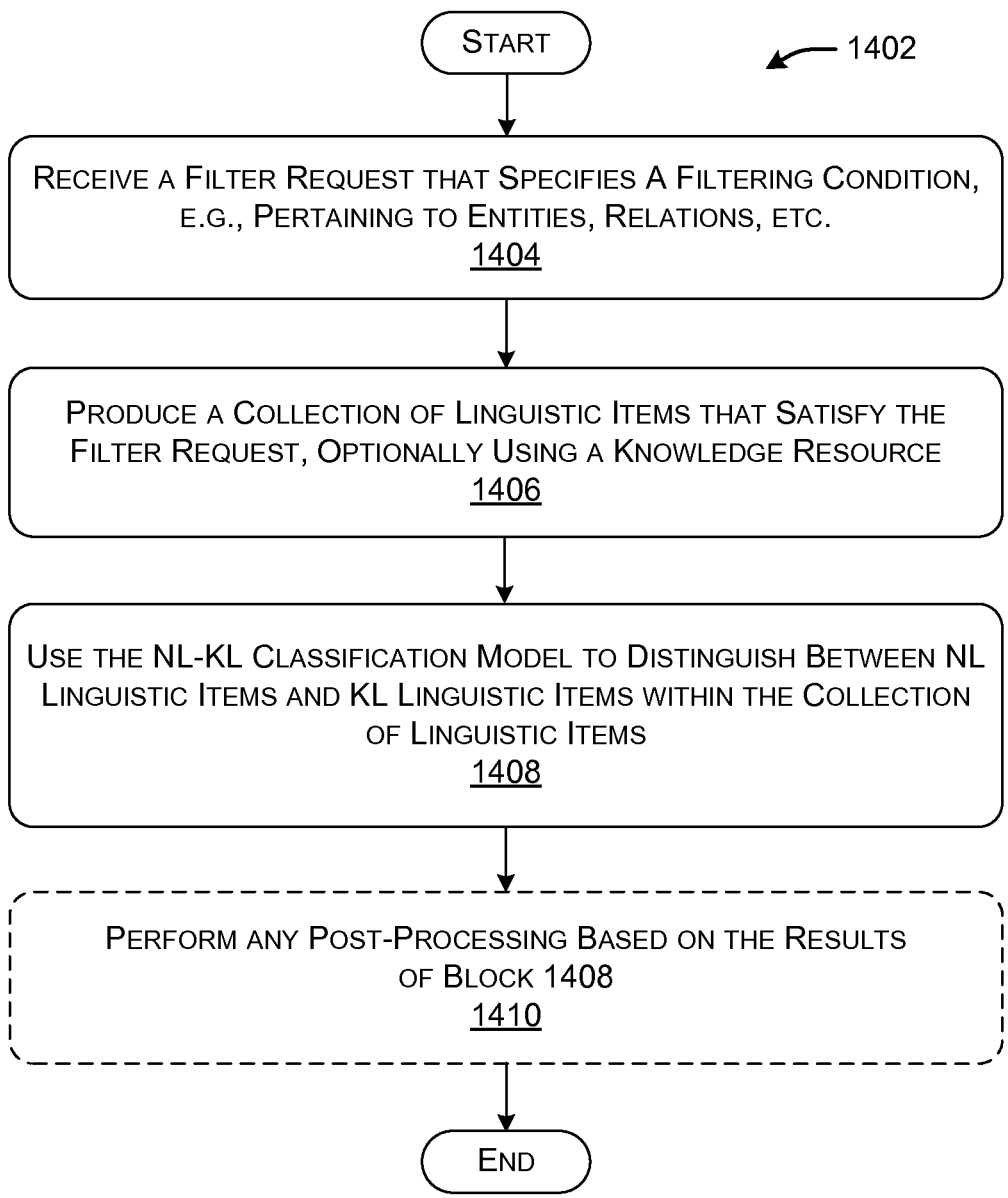
FIG. 14 is a procedure which describes another way of applying the NL-KL classification model, corresponding to the functionality of FIG. 7.

FIG. 14 is a procedure 1402 which describes another manner of applying the NL-KL classification model 104, corresponding to the functionality of FIG. 7. In block 1404, the computer system 102 receives a filter request that specifies a filtering condition. The filtering condition may pertain to one or more entities, one or more relations, etc. In block 1406, the computer system 102 produces a collection of linguistic items that satisfy the filter request, optionally using the knowledge resource 716. In block 1408, the computer system 102 uses the NL-KL classification model 104 to label each of the linguistic items in the collection as either an NL linguistic item or a KL linguistic item. In block 1410, the computer system may perform any action based on the results of block 1408.

Figure 15:
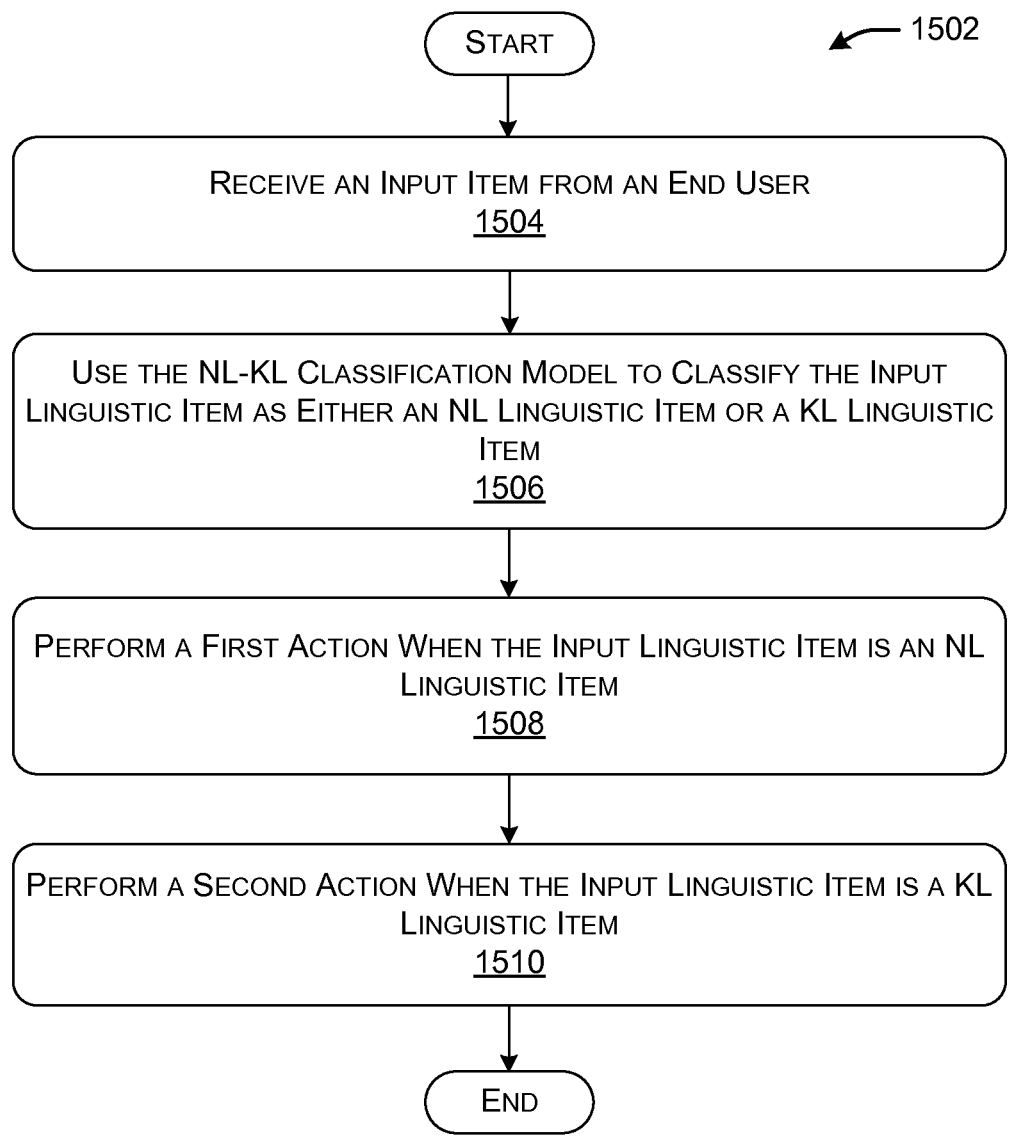
FIG. 15 is a procedure which describes another way of applying the NL-KL classification model, corresponding to the functionality of FIG. 8.

FIG. 15 shows a procedure 1502 which describes another manner of applying the NL-KL classification model 104, corresponding to the functionality of FIG. 8. In block 1504, the computer system 102 receives an input linguistic item. In block 1504, the computer system 102 uses the NL-KL classification model 104 to classify the input linguistic item as either an NL linguistic item or a KL linguistic item. In block 1506, the computer system 102 performs a first action when the input linguistic item is an NL linguistic item. In block 1508, the computer system 102 performs a second action when the input linguistic item is a KL linguistic item. The first and second actions may comprise routing the input linguistic item to first and second destinations, respectively. Or the first and second actions may comprise processing the input linguistic item using first and second processing resources, respectively, and so on.

C. Representative Computing Functionality

FIG. 16 shows computing functionality 1602 that can be used to implement any aspect of the computer system 102 of FIG. 1, e.g., using the computing equipment of FIG. 9 or some other computing equipment. For instance, the type of computing functionality 1602 shown in FIG. 16 can be used to implement an aspect of the training system 106 and/or any aspect of an application environment 110. In all cases, the computing functionality 1602 represents one or more physical and tangible processing mechanisms.

The computing functionality 1602 can include one or more processing devices 1604, such as one or more central processing units (CPUs), and/or one or more graphical processing units (GPUs), and so on.

The computing functionality 1602 can also include any storage resources 1606 for storing any kind of information, such as code, settings, data, etc. Without limitation, for instance, the storage resources 1606 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 1602. The computing functionality 1602 may perform any of the functions described above when the processing devices 1604 carry out instructions stored in any storage resource or combination of storage resources.

As to terminology, any of the storage resources 1606, or any combination of the storage resources 1606, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1602 also includes one or more drive mechanisms 1608 for interacting with any storage resource, such as a hard disk drive mechanism, an optical disk drive mechanism, and so on.

The computing functionality 1602 also includes an input/output module 1610 for receiving various inputs (via input devices 1612), and for providing various outputs (via output devices 1614). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1616 and an associated graphical user interface (GUI) 1618. Other output devices include a printer, a model-generating mechanism, a tactile output mechanism, an archival mechanism (for storing output information), and so on. The computing functionality 1602 can also include one or more network interfaces 1620 for exchanging data with other devices via one or more communication conduits 1622. One or more communication buses 1624 communicatively couple the above-described components together.

The communication conduit(s) 1622 can be implemented in any manner, e.g., by a local area network, a wide area network (e.g., the Internet), point-to-point connections, etc., or any combination thereof. The communication conduit(s) 1622 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1602 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described above can employ various mechanisms to ensure the privacy of user data maintained by the functionality (if any), in accordance with user expectations and applicable laws and norms of relevant jurisdictions. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems.

This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system comprising:
one or more processing devices; and
one or more storage resources storing instructions which, when executed by the one or more processing devices, cause the one or more processing devices to:
receive an input linguistic item;
use a classification model to produce a label which identifies the input linguistic item as:
a natural language linguistic item, which expresses an intent using a natural language, or
a keyword language linguistic item, which expresses the intent using one or more keywords; and
perform an action on the input linguistic item based at least on the label,
the classification model being trained using training sets, individual training sets comprising an individual natural language linguistic item and an individual keyword language linguistic item that is identified as being related to the individual natural language linguistic item based at least on user behavior as reflected in a query click log.

2. The computer system of claim 1, wherein the instructions, when executed by the one or more processing devices, cause the one or more processing devices to:
receive a set of input linguistic items;
use the classification model to classify each of the set of input linguistic items as either a natural language linguistic item or a keyword language linguistic item, yielding, overall, a subset of natural language linguistic items and a subset of keyword language linguistic items; and
use a machine learning technique to generate a natural language interpretation model, based at least on the subset of natural language linguistic items.

3. The computer system of claim 2, wherein the natural language interpretation model is a spoken language understanding model.

4. The computer system of claim 1, wherein the instructions, when executed by the one or more processing devices, cause the one or more processing devices to:
produce a collection of linguistic items that match a filtering condition specified in a filter request; and
classify each of the collection of linguistic items as either a natural language linguistic item or a keyword language linguistic item, yielding, overall, a subset of natural language linguistic items and a subset of keyword language linguistic items.

5. The computer system of claim 4, wherein the instructions, when executed by the one or more processing devices, cause the one or more processing devices to:
use a knowledge resource to generate the collection of linguistic items, the knowledge resource specifying a plurality of entities and relations among the entities.

6. The computer system of claim 1, wherein the instructions, when executed by the one or more processing devices, cause the one or more processing devices to:
receive a set of input linguistic items;
classify each of the set of input linguistic items as either a natural language linguistic item or a keyword language linguistic item, yielding, overall, a subset of natural language linguistic items and a subset of keyword language linguistic items; and
filter the subset of natural language linguistic items and/or the subset of keyword language linguistic items based at least on a filtering condition specified in a filter request.

7. The computer system of claim 1, wherein the instructions, when executed by the one or more processing devices, cause the one or more processing devices to:
perform a first action when the input linguistic item is a natural language linguistic item, and perform a second action when the input linguistic item is a keyword language linguistic item.

8. The computer system of claim 7,
wherein the first action comprises processing the input linguistic item with a first processing resource, and
wherein the second action comprises processing the input linguistic item with a second processing resource.

9. The computer system of claim 7,
wherein the first action comprises routing the input linguistic item to a first destination, and
wherein the second action comprises routing the input linguistic item to a second destination.

10. The computer system of claim 1, wherein the training sets comprise training pairs.

11. A method performed by one or more processing devices, the method comprising:
identifying training sets comprising natural language linguistic items and related keyword language linguistic items, the training sets being identified based at least on similarity of user behavior by users that submit the natural language linguistic items and the related keyword language linguistic items as queries to a search engine;
training a classification model to distinguish between natural language input and keyword language input, the classification model being trained using the training sets;
receiving an input linguistic item; and
using the trained classification model to produce a label which identifies the input linguistic item as:
an input natural language linguistic item, which expresses an intent using natural language; or
an input query language linguistic item, which expresses the intent using one or more keywords.

12. A method implemented using one or more computing devices, the method comprising:
producing and storing a set of pair items based at least on relative similarity of the pair items as determined using a query click log, each pair item in the set of pair items including:
(a) a natural language (NL) linguistic item, which expresses an intent using natural language; and
(b) a keyword language (KL) linguistic item, which expresses the intent using one or more keywords, and is related to the NL linguistic item; and
using a machine learning technique to generate and store an NL-KL classification model based, in part, on the set of pair items, the NL-KL classification model being configured to identify whether an input linguistic item corresponds to either an NL linguistic item or a KL linguistic item.

13. The method of claim 12, wherein said producing of the set of pair items comprises:
receiving a set of domain-labeled linguistic items;
determining a set of domain-independent linguistic items based at least on the set of domain-labeled linguistic items;
determining a set of matching linguistic items that contain at least one domain-independent linguistic item from the set of domain-independent linguistic items;
determining a set of linked linguistic items that are linked to the set of matching linguistic items, based at least on common actions taken by users, as reflected in the query click log; and
formulating the set of pair items based at least on the set of matching linguistic items and the set of linked linguistic items.

14. The method of claim 13, wherein the set of linked linguistic items are associated with the set of matching linguistic items based at least on common selections made by users in response to submitting the set of matching linguistic items and the set of linked linguistic items.

15. The method of claim 12, wherein generating of the NL-KL classification model comprises:
applying a first machine learning technique to the set of pair items, to produce an initial classification model;
receiving a set of new linguistic items;
using the initial classification model to determine whether each new linguistic item in the set of new linguistic items is an NL linguistic item or a KL linguistic item, to produce a set of initially-labeled linguistic items;
removing noise from the set of initially-labeled linguistic items, to produce a set of filtered linguistic items;
receiving additional labels for at least part of the set of filtered linguistic items provided by human annotators, to produce a set of refined linguistic items; and
applying a second machine learning technique to the set of refined linguistic items to produce the NL-KL classification model.

16. The method of claim 15,
wherein the first machine learning technique uses a first set of features, and the second machine learning techniques uses a second set of features,
wherein the first set of features includes lexical features and structural features, and
wherein the second set of features includes lexical features, structural features, and semantic features.

17. The method of claim 16, wherein at least one semantic feature identifies a presence of non-NL content in an input linguistic item, where that non-NL content resembles NL content.

18. The method of claim 12, further comprising applying the NL-KL classification model by:
receiving a set of input linguistic items;
using the NL-KL classification model to classify each of the input linguistic items as either an NL linguistic item or a KL linguistic item, to produce, overall, a subset of NL linguistic items and a subset of KL linguistic items; and
using a machine learning technique to generate a natural language interpretation model, based at least on the subset of NL linguistic items.

19. The method of claim 12, further comprising applying the NL-KL classification model by:
receiving a filter request that specifies a filtering condition;
producing a collection of linguistic items that match the filtering condition, based, at least in part, on a knowledge resource; and
classifying each of the collection of linguistic items as either an NL linguistic item or a KL linguistic item, to produce, overall, a subset of NL linguistic items and a subset of KL linguistic items.

20. The method of claim 12, further comprising applying the NL-KL classification model by:
receiving an input linguistic item;
using the NL-KL classification model to classify the input linguistic item as either an NL linguistic item or a KL linguistic item;
performing a first action when the input linguistic item is an NL linguistic item; and
performing a second action when the input linguistic item is a KL linguistic item.

* * * * *